(12) United States Patent
Kawashima et al.

(10) Patent No.: US 8,195,336 B2
(45) Date of Patent: Jun. 5, 2012

(54) PRESSURE REGULATOR

(75) Inventors: Kenji Kawashima, Yokohama (JP);
Toshiharu Kagawa, Yokohama (JP);
Tomonori Kato, Yokohama (JP)

(73) Assignee: Tokyo Institute of Technology, Tokyo (JP)

( * ) Notice: Subject to any disclaimer, the term of this patent is extended or adjusted under 35 U.S.C. 154(b) by 555 days.

(21) Appl. No.: 12/445,196

(22) PCT Filed: Oct. 10, 2007

(86) PCT No.: PCT/JP2007/069774
§ 371 (c)(1),
(2), (4) Date: Apr. 10, 2009

(87) PCT Pub. No.: WO2008/044712
PCT Pub. Date: Apr. 17, 2008

(65) Prior Publication Data
US 2010/0030386 A1 Feb. 4, 2010

(30) Foreign Application Priority Data
Oct. 11, 2006 (JP) .................. 2006-277501

(51) Int. Cl.
G05D 7/00 (2006.01)
G05D 11/00 (2006.01)
G06F 17/00 (2006.01)
G05B 21/00 (2006.01)

(52) U.S. Cl. .......... 700/282; 700/90; 700/266; 700/268; 703/2; 703/9

(58) Field of Classification Search ............ 700/282, 700/90, 266, 268; 703/2, 9
See application file for complete search history.

(56) References Cited

U.S. PATENT DOCUMENTS
3,688,095 A * 8/1972 Sakamoto et al. ............ 700/282
(Continued)

FOREIGN PATENT DOCUMENTS
JP 2002-540519 T 11/2002
(Continued)

OTHER PUBLICATIONS

Kawashima, Kenji; Ishii, Yukio; Funaki, Tatsuya; and Kagawa, Toshiharu, "Determination of Flow Rate Characteristics of Pneumatic Solenoid Valves Using an Isothermal Chamber", Mar. 2004, Journal of Fluids Engineering, vol. 126.*

(Continued)

Primary Examiner — Kakali Chaki
Assistant Examiner — Kelvin Booker
(74) Attorney, Agent, or Firm — Crowell & Moring LLP

(57) ABSTRACT

A pressure regulator for controlling pressure with high response and high accuracy even a flow change occurs on the downstream side. The pressure regulator (1) regulates the rate of inflow into an isothermal pressure vessel (13) for the gas supplied from a gas supply source (10) by means of a servo valve (11) to maintain the constant pressure in the isothermal pressure vessel (13). Pressure control means (a computer (16)) operating the servo valve (11) has as a main loop a pressure control system for feedback-controlling the pressure in the isothermal pressure vessel (13) measured by a pressure gauge (14) and has therein a rate-of-inflow-control system for feedback-controlling the rate of flow measured by a flow meter (12), an observer for estimating the rate of outflow from the isothermal pressure vessel (13) according to the rate of inflow and the derivative of the pressure in the isothermal pressure vessel (13) measured by a pressure differentiator (15), and a model follow-up control system for feed-backing the estimated rate of outflow to the rate-of-inflow control system.

26 Claims, 10 Drawing Sheets

U.S. PATENT DOCUMENTS

| | | | | |
|---|---|---|---|---|
| 3,774,763 | A * | 11/1973 | Yall et al. | 210/96.2 |
| 3,875,380 | A * | 4/1975 | Rankin | 700/282 |
| 3,891,166 | A * | 6/1975 | May | 244/3.22 |
| 4,057,396 | A * | 11/1977 | Matovich | 700/266 |
| 4,200,120 | A * | 4/1980 | Kimata et al. | 137/613 |
| 4,449,568 | A * | 5/1984 | Narasimham | 164/453 |
| 4,811,755 | A * | 3/1989 | Bourdon et al. | 137/486 |
| 4,893,663 | A * | 1/1990 | Ely | 700/167 |
| 4,975,238 | A * | 12/1990 | Regan et al. | 700/282 |
| 5,083,745 | A * | 1/1992 | Tischer | 251/129.11 |
| 5,091,844 | A * | 2/1992 | Waltz | 700/282 |
| 5,142,483 | A * | 8/1992 | Basham et al. | 700/282 |
| 5,195,316 | A * | 3/1993 | Shinzawa et al. | 60/286 |
| 5,195,318 | A * | 3/1993 | Shinzawa et al. | 60/286 |
| 5,287,698 | A * | 2/1994 | Shinzawa et al. | 60/286 |
| 5,311,739 | A * | 5/1994 | Clark | 60/39.6 |
| 5,319,930 | A * | 6/1994 | Shinzawa et al. | 60/286 |
| 5,503,735 | A * | 4/1996 | Vinas et al. | 210/87 |
| 5,524,477 | A * | 6/1996 | Wajid | 73/24.05 |
| 5,725,758 | A * | 3/1998 | Chace et al. | 210/85 |
| 5,769,608 | A * | 6/1998 | Seale | 417/53 |
| 6,470,679 | B1 * | 10/2002 | Ertle | 60/512 |
| 6,725,167 | B2 * | 4/2004 | Grumstrup et al. | 700/282 |
| 6,739,425 | B1 * | 5/2004 | Griffin et al. | 181/171 |
| 7,164,703 | B2 * | 1/2007 | Paetzel | 372/57 |
| 7,170,582 | B2 * | 1/2007 | Butler et al. | 355/53 |
| 7,641,028 | B2 * | 1/2010 | Fox | 267/64.28 |
| 7,703,585 | B2 * | 4/2010 | Fox | 267/64.28 |
| 2002/0163827 | A1 | 11/2002 | Mullarkey et al. | |
| 2003/0234144 | A1 * | 12/2003 | Fox | 188/278 |
| 2006/0126040 | A1 * | 6/2006 | Butler et al. | 355/53 |
| 2006/0288790 | A1 | 12/2006 | Kawashima et al. | |
| 2008/0013058 | A1 * | 1/2008 | Tatsuzaki | 355/53 |
| 2008/0041676 | A1 * | 2/2008 | Pletner et al. | 188/267.2 |
| 2008/0042331 | A1 * | 2/2008 | Pletner et al. | 267/136 |
| 2008/0079204 | A1 * | 4/2008 | Pletner et al. | 267/64.17 |
| 2008/0179795 | A1 * | 7/2008 | Fox | 267/64.11 |
| 2009/0145737 | A1 * | 6/2009 | Kamen et al. | 202/185.1 |
| 2010/0263974 | A1 * | 10/2010 | Fox | 188/313 |

FOREIGN PATENT DOCUMENTS

| | | |
|---|---|---|
| JP | 2004-310478 A | 11/2004 |
| JP | 2005-98991 A | 4/2005 |
| JP | 2005-531069 T | 10/2005 |
| JP | 2006-144859 A | 6/2006 |
| WO | WO 00/58802 A1 | 10/2000 |

OTHER PUBLICATIONS

Samson AG, "Technical Information: Cavitation in Control Valves", Nov. 2003, retrieved from the Internet on Mar. 1, 2012 at www.samson.de.*

Ueda, Tetsuya; Oyama, Osamu; Yoshimitsu, Toshihiro; and Kagawa, Toshiharu, "All in One Type Fluid Flow Servo System Using Solenoid Valve and Isothermal Pressure Vessel", Sep. 2008, Proceedings of the 7$^{th}$ JFPS International Symposium on Fluid Power, Toyama 2008.*

"Characteristic Analysis of Laminar Flow Meter for Gases with High Speed Response" by Tatsuya Funaki, et al., Proceedings of the Society of Instrument and Control Engineers, vol. 40, No. 10, pp. 1008-1013 (2004).

"Flow Rate Measurement of Compressible Fluid Using Pressure Change in the Chamber" by Kenji Kawashima, et al., Proceedings of the Society of Instrument and Control Engineers, vol. 32, No. 11, pp. 1485-1492 (1996).

International Search Report dated Dec. 25, 2007 w/English translation (four (4) pages).

* cited by examiner

PRESSURE REGULATOR

TECHNICAL FIELD

The present invention relates to a pressure regulator for maintaining a constant pressure and an air spring vibration isolator using the pressure regulator.

BACKGROUND ART

A pressure control of gas is essential for controlling a flow rate of inert gas in semiconductor manufacturing processes, for an air spring vibration isolation table to be used for a base of a semiconductor manufacturing exposure apparatus, for analysis equipments of various kinds of gases, and the like. An accurate pressure control has been required in many fields including apparatuses for semiconductor manufacturing.

Pressure regulators for maintaining a constant pressure which use a mechanical feedback mechanism are available in the market at low prices. For example, an accurate pilot regulator provided with a mechanical feedback mechanism is commonly used. However, if a large amount of gas is flown into the regulator, accurate measurement and control of the gas becomes difficult due to the effect of the gas. Therefore, to avoid the difficulty, a vessel which has a large capacity is installed as a buffer for reducing the effect of the change of the flow rate being used. However, if the vessel having a large capacity is installed, a large space is occupied by the installation.

Therefore, in a pressure control apparatus which controls a pressure in a pressure vessel at a constant value by regulating an amount of air flowing into the pressure vessel by a pneumatic servo valve, inventors of the present invention proposed a pressure control apparatus in the following patent document 1 which measures an inflow rate of air flowing into a pressure vessel by disposing a flow meter at a gas outlet of the pneumatic servo valve and includes a cascade control mechanism consisting of a main loop for feedback-controlling a pressure measured by a pressure gauge by disposing the pressure gauge in the pressure vessel for measuring the pressure in the pressure vessel and a minor loop for feedback-controlling the inflow rate measured by the flow meter. With the technology described above, it has become possible that a pressure of air flowing out through a pneumatic servo valve can be controlled at high speed.

In addition, in the following patent document 2, the inventors of the present invention proposed a vibration isolator provided with an air spring as a supporting leg using a flow rate control servo valve.

Patent document 1: Japanese Patent Laid-open Publication No. 2004-310478 (paragraphs 0016-0021, FIG. 1, FIG. 2)
Patent document 2: Japanese Patent Laid-open Publication No. 2006-144859 (paragraphs 0024-0044, FIG. 10)

PROBLEMS TO BE SOLVED BY THE INVENTION

In the pressure control apparatus proposed in the patent document 1, a pressure control with high speed was achieved by feedback-controlling an inflow rate of air flowing into a pressure vessel. However, to conduct a pressure control with high speed even when a flow rate change occurs in the downstream as well, it is required to detect and control an outflow rate of air flowing out from the pressure vessel.

Then, a method for further disposing a flow meter in the downstream of the pressure vessel may be adopted for measuring an outflow rate of air flowing out from the pressure vessel. However, since a pressure loss is generated by the flow meter disposed in the downstream, an accurate pressure control was difficult.

In addition, for further improving a response and accuracy of the vibration isolator proposed in the patent document 2, a fast and accurate control of pressure of the air supply source for the air spring is required, in addition to the pressure control of the air spring.

Considering the problems described above, it is an object of the present invention to provide a pressure regulator which can conduct a pressure control with fast response and high accuracy.

It is another object of the present invention to provide an air spring vibration isolator which is capable of fast response and highly-accurate position stabilization.

DISCLOSURE OF INVENTION

The present invention has been developed for achieving the purposes described above, and according to a first aspect of the present invention, there is provided a pressure regulator, which includes: a servo valve for regulating an inflow rate of a compressive fluid to be supplied from a compressive fluid supply source; an isothermal pressure vessel for isothermally maintaining the compressive fluid flowing into the isothermal pressure vessel via the servo valve; a pressure differential value detection means for detecting a pressure differential value of the compressive fluid in the isothermal pressure vessel; and a pressure control means for controlling a pressure of the compressive fluid in the isothermal pressure vessel at a predetermined pressure by operating the servo valve, wherein the pressure control means includes: a pressure control system for feedback-controlling the pressure detected by the pressure detection means; an inflow rate control system for feedback-controlling the inflow rate of the compressive fluid flowing into the isothermal pressure vessel; and an outflow rate estimating means for estimating an outflow rate of the compressive fluid flowing out from the isothermal pressure vessel based on the pressure differential value detected by the pressure differential value detection means, wherein a model follow-up control system for feeding back the outflow rate estimated by the outflow rate estimating means to the inflow rate control system is configured in a control loop of the pressure control system.

In the configuration described above, since the pressure regulator uses the isothermal pressure vessel as a buffer, an inflow process and outflow process of the compressive fluid, which is represented by gas such as air, flowing into the isothermal pressure vessel may be assumed as an isometric and isothermal process. Then, the pressure control can be simply executed.

To control the compressive fluid in the isothermal pressure vessel at a predetermined pressure, an inflow rate of the compressive fluid, which is supplied from the compressive fluid supply source, flowing into the isothermal pressure vessel is regulated. In this case, the pressure regulator regulates the inflow rate by operating the servo valve with the pressure control means, in which the pressure control system which feedback-controls the pressure of the compressive fluid in the isothermal pressure vessel is configured as a main loop, to control the compressive fluid in the isothermal pressure vessel at a predetermined pressure.

Here, the pressure control means feedback-controls the inflow rate of the compressive fluid flowing into the isothermal pressure vessel by the inflow rate control system which is configured in the pressure control system as a minor loop, and compensates by the model follow-up control system which estimates the outflow rate of the compressive fluid flowing out from the isothermal pressure vessel based on the pressure differential value of the compressive fluid in the isothermal pressure vessel using the outflow rate estimating means and feeds back the estimated outflow rate to the inflow rate control system.

According to a second aspect of the present invention, there is provided a pressure regulator, which includes: a servo valve for regulating an inflow rate of a compressive fluid to be supplied from a compressive fluid supply source; an isothermal pressure vessel for isothermally maintaining the compressive fluid flowing into the isothermal pressure vessel via the servo valve; an inflow rate acquiring means for acquiring an inflow rate of the compressive fluid flowing into the isothermal pressure vessel via the servo valve; a pressure detection means for detecting a pressure of the compressive fluid in the isothermal pressure vessel; a pressure differential value detection means for detecting a pressure differential value of the compressive fluid in the isothermal pressure vessel; and a pressure control means for controlling a pressure of the compressive fluid in the isothermal pressure vessel at a predetermined pressure by operating the servo valve, wherein the pressure control means includes: a pressure control system for feedback-controlling the pressure detected by the pressure detection means; an inflow rate control system for feedback-controlling the inflow rate acquired by the inflow rate acquiring means; and an outflow rate estimating means for estimating an outflow rate of the compressive fluid flowing out from the isothermal pressure vessel based on the pressure differential value detected by the pressure differential value detection means and the inflow rate acquired by the inflow rate acquiring means, wherein the inflow rate control system and a model follow-up control system for feeding back the outflow rate estimated by the outflow rate estimating means to the inflow rate control system are configured in a control loop of the pressure control system.

In the configuration described above, since the pressure regulator uses the isothermal pressure vessel as a buffer, an inflow process and outflow process of the compressive fluid, which is represented by gas such as air, flowing into the isothermal pressure vessel may be assumed as an isometric and isothermal process. Therefore, the pressure control can be simply executed.

To control the compressive fluid in the isothermal pressure vessel at a predetermined pressure, an inflow rate of the compressive fluid, which is supplied from the compressive fluid supply source, flowing into the isothermal pressure vessel is regulated. In this case, the pressure regulator regulates the inflow rate by operating the servo valve with the pressure control means, in which the pressure control system which feedback-controls the pressure of the compressive fluid in the isothermal pressure vessel is configured as a main loop, to control the compressive fluid in the isothermal pressure vessel at a predetermined pressure.

Here, the pressure control means feedback-controls the inflow rate of the compressive fluid flowing into the isothermal pressure vessel by the inflow rate control system which is configured in the pressure control system as a minor loop, and compensates by the model follow-up control system which estimates the outflow rate of the compressive fluid flowing out from the isothermal pressure vessel based on the pressure differential value of the compressive fluid in the isothermal pressure vessel and inflow rate of the compressive fluid flowing into the isothermal pressure vessel using the outflow rate estimating means and feeds back the estimated outflow rate to the inflow rate control system.

According to a third aspect of the present invention, there is provided a pressure regulator of the first or second aspect, wherein the servo valve is a spool type servo valve.

In the pressure regulator described above, since the pressure regulator controls the inflow rate using a spool type servo valve which is a flow rate control servo valve, the discharge amount can be reduced in comparison with, for example, a nozzle-flapper type servo valve which is a pressure control type.

According to a fourth aspect of the present invention, there is provided a pressure regulator of any one of the first to third aspects, wherein the pressure differential value detection means is a pressure differentiator which includes a pressure chamber, a diaphragm differential manometer or velocity meter, and a cylindrical slit flow path communicating the isothermal pressure vessel and the pressure chamber.

In the configuration described above, since the pressure differentiator uses the cylindrical slit flow path, the cross section of the flow path can be made large and the time constant can be made small, and accordingly, the pressure differentiator with fast response can be realized.

According to a fifth aspect of the present invention, there is provided a pressure regulator of any one of the second to fourth aspects, wherein the inflow rate acquiring means is a laminar flow meter for measuring the inflow rate of the compressive fluid flowing into the isothermal pressure vessel via the servo valve.

In the configuration described above, since the laminar flow meter, in which a pressure loss is small, is used for acquiring the inflow rate, the effect on the pressure due to measurement of the flow rate can be made small.

According to a sixth aspect of the present invention, there is provided a pressure regulator of any one of the second to fifth aspects, wherein the inflow rate acquiring means estimates the inflow rate of the compressive fluid flowing into the isothermal pressure vessel via the servo valve based on pressures before and after the servo valve and a gate opening degree of the servo valve.

In the configuration described above, the compressive fluid in the isothermal pressure vessel can be controlled rapidly at a predetermined pressure by estimating the inflow rate of the compressive fluid flowing into the isothermal pressure vessel via the servo valve based on the pressures before and after the servo valve and the gate opening degree thereof, as well as using a pressure sensor having an excellent dynamic characteristic.

According to a seventh aspect of the present invention, there is provided a pressure regulator of any one of the first to sixth aspects, wherein the outflow rate estimating means calculates an estimate value Gout (hat thereon) of the outflow rate of the compressive fluid flowing out from the isothermal pressure vessel by the following formula (8) based on the inflow rate Gin of the compressive fluid flowing into the isothermal pressure vessel and a pressure differential value (dP/dt) of the compressive fluid in the isothermal pressure vessel detected by the pressure differential value detection means, $$\hat{G}_{out} = G_{in} - \frac{V}{R\theta} \frac{dP}{dt} \tag{8}$$

where, R is a gas constant [J/(kg·K)], V is a capacity [m$^3$] of the isothermal pressure vessel, $\theta$ is a temperature [K] of air in the isothermal pressure vessel, P is a pressure [Pa] in the isothermal pressure vessel, and t is a time [s].

In the configuration described above, the model follow-up control system which feeds back the estimate value Gout (hat thereon) of outflow rate to an adding node of the inflow rate control system is configured, thereby the pressure control is conducted even for a small change of the outflow rate in the downstream. Accordingly, a pressure regulator with fast response and resistant to disturbances can be configured.

According to an eighth aspect of the present invention, there is provided a vibration isolator, which includes: a table; an air spring for supporting the table; a servo valve for regulating an inflow rate and outflow rate of air for the air spring; a pressure regulator according to any one of claims 1 to 7 for supplying air, which is supplied from an air supply source, to the servo valve with a constant pressure; a position detection means for detecting a position of the table; an acceleration detection means for detecting an acceleration of the table; and an air spring control means for controlling the table at a predetermined position by operating the servo valve based on the position detected by the position detection means and the acceleration detected by the acceleration detection means.

In the configuration described above, the vibration isolator supplies air controlled at a predetermined pressure by the pressure regulator to the servo valve, and regulates the inflow rate and outflow rate for the air spring by operating the servo valve based on a position of the table detected by the position detection means and acceleration of the table detected by the acceleration detection means using the air spring control means for controlling the table at a predetermined position.

According to a ninth aspect of the present invention, there is provided a vibration isolator of the eighth aspect, wherein the servo valve is a spool type servo valve.

In the vibration isolator described above, since the spool type servo valve, which is a flow rate control servo valve, is used as the servo valve for supplying and discharging air to and from the air spring, the discharge amount can be reduced. In addition, by using the spool type servo valve for the servo valve of the pressure regulator as well, the discharge amount can be further reduced.

According to the first aspect of the present invention, since the pressure control is conducted even for a small change of the outflow rate in the downstream, the pressure regulator with fast response and resistant to disturbances can be realized. In addition, since the outflow rate is estimated based on a pressure differential value, the pressure control can be conducted with high accuracy in comparison with the case where the outflow rate is directly measured.

According to the third aspect of the present invention, since the discharge amount can be reduced, the environmental load can also be reduced.

According to the fourth aspect of the present invention, since the pressure differentiator with fast response is used, the response of the pressure regulator is further improved.

According to the fifth aspect of the present invention, since the effect on the pressure due to measurement of the inflow rate is small, the pressure regulator can control a pressure with high accuracy.

According to the sixth aspect of the present invention, the compressive fluid in the isothermal pressure vessel can be controlled fast at a predetermined pressure using a pressure sensor having excellent dynamic characteristics.

According to the seventh aspect of the present invention, since the pressure control is conducted even for a small change of outflow rate in the downstream, a pressure regulator with fast response and resistant to disturbances can be configured.

According to the eighth aspect of the present invention, since a pressure of air in the supply source of the air spring is controlled fast and accurately by the pressure regulator, the vibration isolator can stabilize a position of the table fast and accurately.

According to the ninth aspect of the present invention, the environmental load due to use of the vibration isolator can be reduced.

EXPLANATION OF SYMBOLS

Figure 1:
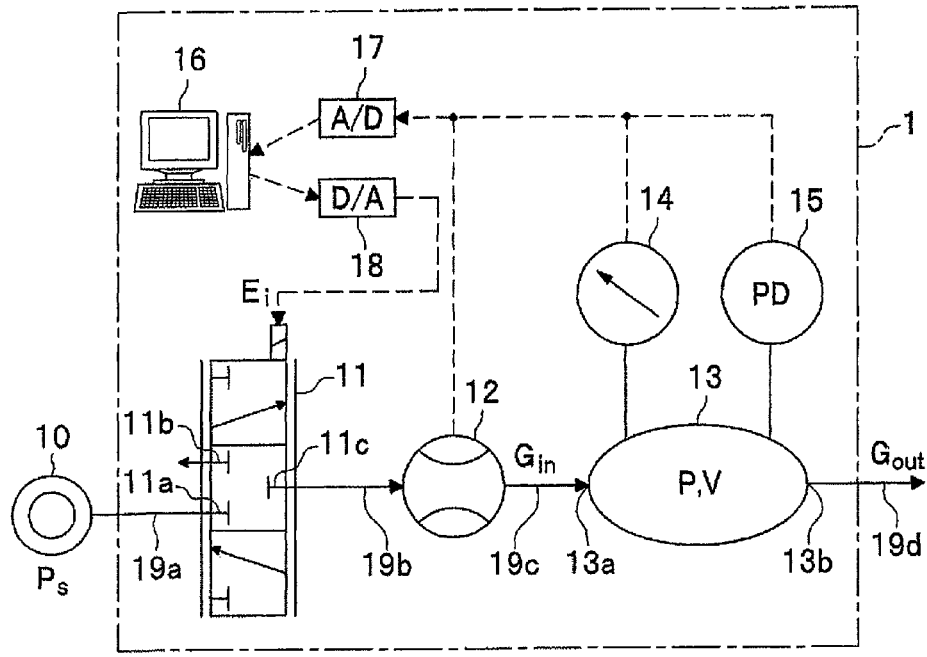
FIG. 1 is a configuration diagram schematically showing a configuration of a pressure regulator according to a first embodiment of the present invention.

1 Pressure regulator
10 Gas supply source (compressive fluid supply source)
10A Air supply source
11 Servo valve
12 Flow meter (inflow rate acquiring means)
13 Isothermal pressure vessel
14 Pressure gauge (pressure detection means)
15 Pressure differentiator (pressure differential value detection means)
16 Computer (pressure control means, air spring control means)
20 Pressure control system
23 Inflow rate control system
27 Observer (Outflow rate estimating means)
28 Model follow-up control system
46 Computer (pressure control means)
100 Vibration isolator
110 Vibration isolation table
111 Air spring
112 Table 113 Position detector (position detection means)
114 Acceleration detector (acceleration detection means)
115 Servo valve
120 Air spring control unit (air spring control means)
151 Isothermal pressure chamber (pressure chamber)
152 Slit flow path
153 Differential manometer

PREFERRED MODES FOR CARRYING OUT THE INVENTION

Embodiments of the present invention will be explained in detail by referring to drawings as appropriate.

First Embodiment

Configuration of Pressure Regulator

FIG. 1 is a configuration diagram schematically showing a configuration of a pressure regulator according to a first embodiment of the present invention.

The pressure regulator 1 shown in FIG. 1 includes a servo valve 11, a flow meter 12, an isothermal pressure vessel 13, a pressure gauge 14, a pressure differentiator 15, a computer 16, an A/D (Analog/Digital) converter 17, and a D/A (Digital/Analog) converter 18. Each of the pressure devices is communicated with each other via channels 19a, 19b, 19c, and 19d.

The pressure regulator 1 according to the first embodiment of the present invention maintains air which is output from an outlet 13b of the isothermal pressure vessel 13 via the channel 19d at a predetermined constant pressure by regulating an inflow rate of gas, which is supplied from a gas supply source 10, flowing into the isothermal pressure vessel 13 by the servo valve 11.

It is noted that in the first embodiment of the present invention, air is used for the explanation as a sample of the compressive fluid. However, the explanation may also be applied to a compressive fluid other than air represented by a gas such as nitrogen, hydrogen, carbon dioxide and the like.

Meanwhile, main symbols to be used for the explanation of the first embodiment of the present invention are listed below.
Fc: Cutoff frequency [Hz]
Gin: Inflow rate [kg/s]
Gout: Outflow rate [kg/s]
Kgi Integration gain Pa·s²/kg
Kp: Proportional gain of pressure control loop [kg/(Pa·s)]
Kv: Voltage-Flow gain of spool type servo valve [kg/(Pa·s)]
L: Length of cylindrical slit flow path [m]
P: Pressure in isothermal pressure vessel [Pa]
Pc: Pressure in chamber of pressure differentiator [Pa]
Pj: Pressure difference applied to differential manometer of pressure differentiator [Pa]
Pref: Target setting pressure [Pa]
Ps: Air supply pressure supplied from gas supply source [Pa]
R: Gas constant [J/(kg·K)]
r1: Outer dimension (radius) of slit flow path [m]
r2: Inner dimension (radius) of slit flow path [m]
T: Time constant [s]
V: Capacity of isothermal pressure vessel [m³]
Vd: Capacity of chamber of pressure differentiator [m³]
θ: Temperature of air in isothermal pressure vessel [K]
μ: Viscosity of air [Pa·s]
ρa: Density of air [kg/m³]

Air Supply Source

The gas supply source (compressive fluid supply source) 10 is a supply source of air, which is a compressive fluid, and a compressed air cylinder may be used for the air supply source. In addition, pumps such as a compressor and the like may be used for supplying the compressed air.

Servo Valve

The servo valve 11 is a flow control servo valve, which regulates an inflow rate of air supplied to the isothermal pressure vessel 13 from the gas supply source 10 via the channel 19a and an outflow rate (negative inflow rate) of air reversely flowing out from the isothermal pressure vessel 13. A spool type servo valve which has a small pressure loss may be preferably used for the servo valve 11.

The servo valve 11 according to the first embodiment of the present invention is a spool type three-way valve in which an inlet port 11a, an outlet port 11b, and a control port 11c are disposed. A connection between the control port 11c and the inlet port 11a or outlet port 11b and gate opening degree of the ports are operated by a control signal (control voltage Ei1) which is output from the computer 16 via the D/A converter 18 for regulating the inflow rate and a direction thereof, accordingly.

The inlet port 11a is connected to the gas supply source 10 via the channel 19a and the outlet port 11b is opened to the atmosphere. In addition, the control port 11c is connected to the flow meter 12 via the channel 19b.

It is noted if a gas which is toxic, inflammable, and odorous, thereby unfavorable to discharge it to the atmosphere, is used, the outlet port 11b is not opened to the atmosphere but a channel is connected to the outlet port 11b for collecting the discharged gas and disposing the gas so as not to affect a human body and others.

Flow Meter

The flow meter (inflow rate acquiring means) 12 measures an inflow rate of air to be supplied to the isothermal pressure vessel 13 from the gas supply source 10 via the servo valve 11. A detection signal of the inflow rate of the measured air is transmitted to the computer 16 via the A/D converter 17.

It is noted that when air in the isothermal pressure vessel 13 is flown out from the outlet port 11b of the servo valve 11, the inflow rate is measured as a negative inflow rate. Hereinafter, a meaning of the "inflow rate" flowing into the isothermal pressure vessel 13 includes the negative inflow rate in the explanation.

For example, a laminar flow meter, an orifice flow meter, and a thermal type flow meter may be used for the flow meter 12. Especially, a laminar flow meter is favorable because a pressure loss is small. In addition, as a flow meter, a differential manometer may be used for measuring a pressure difference before and after the servo valve 11 of a compressive fluid which flows into the isothermal pressure vessel 13 via the servo valve 11.

Further, as a laminar flow meter, the laminar flow meter which is proposed by the inventors of the present invention in the following reference 1 may be used.

Reference 1

Funaki, Kawashima, Kagawa, "Characteristic Analysis of Laminar Flow Meter for Gases with High Speed Response", Proceedings of The Society of Instrument and Control Engineers, Vol. 40, No. 10, pp. 1008-1013 (2004)

Isothermal Pressure Vessel

The isothermal pressure vessel 13 maintains an isothermal condition of air which flows into the isothermal pressure vessel 13 from the inlet 13a via the channel 19c. The isothermal pressure vessel 13 is usually made of metal.

The isothermal pressure vessel 13 may adopt various shapes, for example, a cylindrical shape, a polygonal column shape, a sphere, and an ellipsoidal shape. For example, in the case of cylindrical shape, air is flown into from the inlet 13a disposed on one bottom side, and the air is flown out from the outlet 13b disposed on the other bottom side. In this case, a depth (height of cylinder) in an inflow direction of air is preferably set to not more than two times of maximum width of the cross section (bottom diameter). If the height of the cylinder (depth) is within this range, a generation of pressure gradient when air flows in can be suppressed. In addition, in the case of polygonal column shape, the depth is set to not more than two times of maximum width of the cross section, and in the case of ellipsoidal shape, the depth is set to not more than two times of diameter of the cross section at the center in the depth direction.

Since the isothermal pressure vessel 13 has a role of a buffer tank, a capacity V of the isothermal pressure vessel 13 is preferably set within a range of $5.0 \times 10^{-6}$ Qout to $7.0 \times 10^{-5}$ Qout [m$^3$] for a volume outflow rate Qout [NL/min] of air, however, may be set as appropriate depending on specifications of the response of the pressure regulator 1.

A thermal conductive material which has a large surface area consisting of a bundle of fine metal wire or a porous metal body is filled in the isothermal pressure vessel 13. A heat transfer area in the isothermal pressure vessel 13 can be increased by filling the thermal conductive material in the isothermal pressure vessel 13. Therefore, a temperature change of air in the isothermal pressure vessel 13 when the air is flown into the isothermal pressure vessel 13 and flown out from the isothermal pressure vessel 13 is suppressed by the thermal conductive material. The suppression of the temperature change by the thermal conductive material becomes further effective if the isothermal pressure vessel 13 is made of a material having a higher thermal conductivity.

As a thermal conductive material having a large surface area, for example, a bundle of fine metal wire such as steel wool, a porous metal body such as cupper wire, or a flocculation body composed of cotton or plastics may be adopted. Namely, if the thermal conductive material is the bundle of fine metal wire or fibers such as flocculation of cotton or plastics, it is preferable that a diameter of the fiber is within a range of 10 to 50 [μm] since a large heat transfer area can be obtained. In addition, it is preferable that a thermal conductivity of the thermal conductive material is not less than 0.05 [W/mK]. With respect to the thermal conductive material, for example, a material and a filling amount thereof in the isothermal pressure vessel 13 are adjusted so that a temperature change of air in the isothermal pressure vessel 13 is suppressed within about 3 [K]. As described above, a heat transfer area can be increased by filling a thermal conductive material such as steel wool into the isothermal pressure vessel 13.

In addition, it is preferable that a filling density of a thermal conductive material is within a range of 200 to 400 [kg/m$^3$]. If the filling density is within this range, a temperature change of air in the isothermal pressure vessel 13 can be sufficiently suppressed.

Pressure Gauge

The pressure gauge (pressure detection means) 14 measures a pressure P of air in the isothermal pressure vessel 13, and transmits a detection signal of the measured result (pressure value) to the computer 16 via the A/D converter 17. The pressure gauge 14 is not specifically limited as long as the pressure gauge 14 is capable of outputting a pressure value of air as an electric signal. For example, a semiconductor pressure sensor may be used. It is preferable that a measurable range of the pressure gauge 14 covers a range from the atmospheric pressure to a supply pressure Ps of air which is supplied from the air supply source 10.

Pressure Differentiator

The pressure differentiator (pressure differential value detection means) 15 measures a differential value dP/dt of a pressure P of air in the isothermal pressure vessel 13, and transmits a detection signal of the measured result (pressure differential value) to the computer 16 via the A/D converter 17.

As the pressure differentiator 15, for example, the pressure differentiator proposed by the inventors of the present invention in the following reference 2 may be used.

Reference 2

Japanese Patent laid-open Publication No. 2005-98991

In the first embodiment of the present invention, a pressure differentiator, which has a faster response than that of the pressure differentiator using a flat plate slit flow path proposed in the reference 2 described above, is used.

Hereinafter, a configuration of the pressure differentiator 15 in the first embodiment of the present invention will be explained by referring to FIG. 2.

Figure 2:
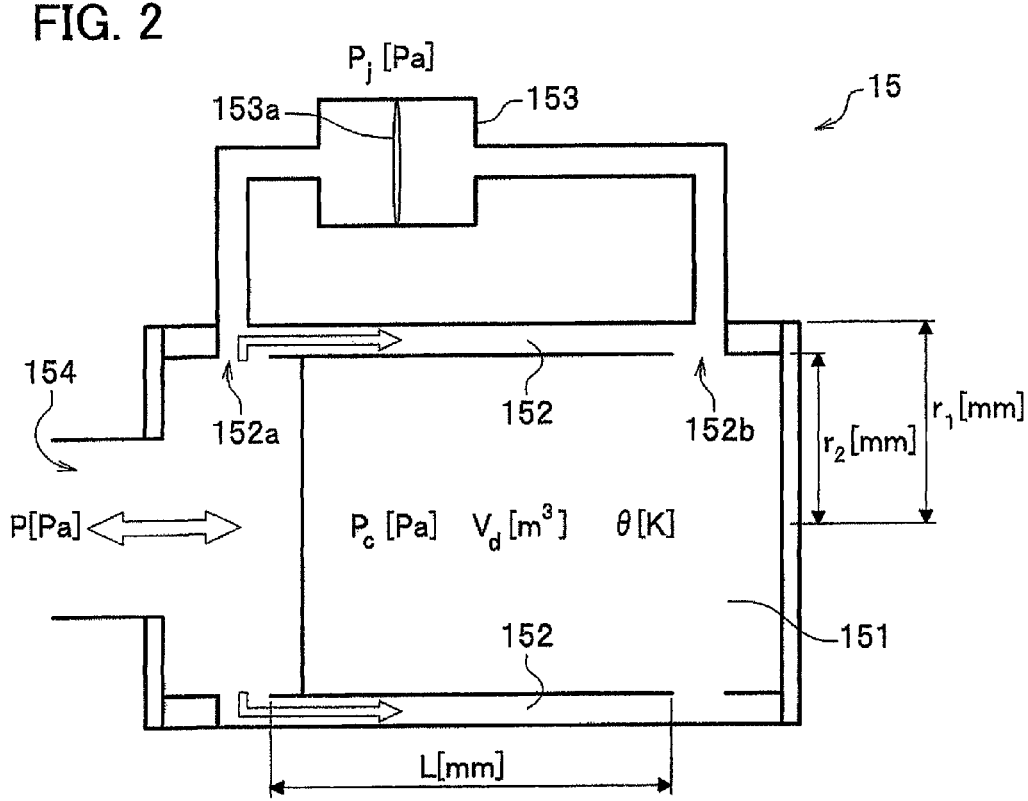
FIG. 2 is a cross sectional view schematically showing a configuration of a pressure differentiator according to the first embodiment.

Meanwhile, FIG. 2 is a cross sectional view schematically showing a configuration of a pressure differentiator according to the first embodiment of the present invention.

The pressure differentiator 15 shown in FIG. 2 includes an isothermal pressure chamber 151, a slit flow path 152, and a differential manometer 153.

In FIG. 2, the pressure differentiator 15 has a cylindrical outer shape with bottoms whose radius is r1 at the right and left ends, and an opening portion 154 is formed on the bottom at the left end. The opening portion 154 is connected to the isothermal pressure vessel 13.

On the right side of the opening portion 154, the isothermal pressure chamber 151 which has a cylindrical shape with a bottom whose radius is r2 is disposed, and a cylindrical slit flow path 152 is formed by side faces of the pressure differentiator 15 and the isothermal pressure chamber 151. A pressure of air at an opening portion 152a at the left end of the slit flow path 152 becomes a pressure P of air in the isothermal pressure vessel 13 which is a target of the measurement. In addition, an opening portion 152b at the right end which is spaced a flow path length L from the opening portion 152a is communicated with an inner side of the isothermal pressure chamber 151, and a pressure of air at the opening portion 152b becomes a pressure Pc of air in the isothermal pressure chamber 151. In addition, on the side face of the pressure differentiator 15, a differential manometer 153 for measuring a pressure difference Pj of air between the opening portion 152a and opening portion 152b of the slit flow path 152 is disposed.

The isothermal pressure chamber (pressure chamber) 151 is filled with a thermal conductive material such as cupper wire, as with the isothermal pressure vessel 13 of the regulator 1 shown in FIG. 1, and quickly absorbs or supplies heat when air flows in or flows out via the slit flow path 152 for maintaining a constant temperature of air in the isothermal pressure chamber 151. It is preferable that a capacity of the isothermal pressure chamber 151 is within a range of $1.0 \times 10^{-8}$ to $1.0 \times 10^{-4}$ [m$^3$]. If the capacity is not less than $1.0 \times 10^{-8}$ [m$^3$], the isothermal pressure chamber 151 can be easily formed. In addition, if the capacity is not more than $1.0 \times 10^{-4}$ [m$^3$], a measurement with fast response becomes possible.

Further, with respect to the thermal conductive material, materials identical to those of the isothermal pressure vessel 13 may be used by filling them with the same volume ratio.

The slit flow path 152 is a cylindrical flow path surrounded by side faces of the pressure differentiator 15 and the isothermal pressure chamber 151. Air flowing inside the slit flow path 152 is preferably a laminar flow during the measurement. Under this condition, a flow rate is proportional to a pressure, and a pressure differential value can be measured accurately.

The differential manometer 153 is a diaphragm differential manometer having a diaphragm 153a, and a signal corresponding to a pressure difference Pj between both sides of the diaphragm 153a is output.

Other than the diaphragm differential manometer, another type of differential manometer using, for example, a bellows may be used.

Here, an operating principle of the pressure differentiator 15 will be explained.

If a measurement pressure P is changed, air flows into the isothermal pressure chamber 151 through the slit flow path 152, and subsequently a pressure Pc in the isothermal pressure chamber 151 changes immediately. If a pressure difference Pj (=P−Pc) generated at the time is measured, a relation between a pressure differential vale dP/dt and the pressure difference Pj is expressed by a linear delay relation as formula (1) (see reference 3).

Reference 3
Kawashima, Fujita, Kagawa, "Flow Rate Measurement of Compressible Fluid Using Pressure Change in the Chamber", Proceedings of The Society of Instrument and Control Engineers, Vol. 32, No. 11, pp. 1485-1492 (1996)

$$P_j = \frac{T}{1+Ts}\frac{dP}{dt} \quad (1)$$

Here, a time constant T is expressed by formula (2).

$$T = \frac{K}{P} = \frac{6P_a\mu LV_d}{P\rho_a\pi r_2(r_1-r_2)^3 R\theta} \quad (2)$$

where r1 and r2 indicate an outer dimension (radius) and an inner dimension (radius) of the cylindrical slit flow path 152, respectively.

As a result, a cutoff frequency fc is expressed by formula (3).

$$f_c = \frac{1}{2\pi T} = \frac{P\rho_a r_2(r_1-r_2)^3 R\theta}{12P_a\mu LV_d} \quad (3)$$

Since the pressure differentiator 15 according to the first embodiment of the present invention uses a cylindrical slit flow path, a cross sectional area of the flow path can be enlarged in comparison with the pressure differentiator using a flat plate slit flow path proposed in the reference 2. Therefore, the time constant T can be made small and a response of the pressure differentiator becomes fast.

Returning to FIG. 1, explanation for the configuration of the pressure regulator 1 will be continued.

Channel

The channels 19a, 19b, 19c, and 19d connect the gas supply source 10 and inlet port 11a of the servo valve 11, the control port 11c of the servo valve 11 and flow meter 12, the flow meter 12 and inlet 13a of the isothermal pressure vessel 13, and the outlet 13b of the isothermal pressure vessel 13 and, for example, an external equipment such as a vibration isolator, respectively.

Meanwhile, cross sectional areas of the channels 19a, 19b, 19c, and 19d are preferably set to not less than four times of an effective cross sectional area of the servo valve 11, because if the cross sectional areas of the channels 19a, 19b, 19c, and 19d are within the range described above, a pressure drop due to the channels becomes negligible.

A/D Converter, D/A Converter

The A/D converter 17 converts analog signals detected by the flow meter 12, pressure gauge 14, and pressure differentiator 15 into digital signals, and outputs to the computer 16. In addition, a D/A converter 18 converts a digital signal of opening/closing or gate opening degree of the servo valve 11 into an analog signal, and outputs to the servo valve 11.

Computer

The computer (pressure control means) 16 receives a detection signal of inflow rate Gin of air measured by the flow meter 12, a detection signal of pressure P of air in the isothermal pressure vessel 13 measured by the pressure gauge 14, and a detection signal of differential value dP/dt of pressure in the isothermal pressure vessel 13 measured by the pressure differentiator 15 via the A/D converter 17 as digital signals, and based on the detected signals, transmits a control voltage Ei1 for controlling the inflow rate Gin (include "negative inflow rate" where air flows out from outlet port 11b of servo valve 11) of air flowing into the isothermal pressure vessel 13 to the servo valve 11 via the D/A converter 18.

In the computer 16, a calculation for controlling opening/closing or gate opening degree of the servo valve 11 is executed by using the inflow rate Gin of air measured by the flow meter 12, the pressure P of air in the isothermal pressure vessel 13 measured by the pressure gauge 14, and the pressure differential value dP/dt of air in the isothermal pressure vessel 13 measured by the pressure differentiator 15 as needed.

Pressure Control Method

Next, a pressure control using the pressure regulator 1 according to the first embodiment of the present invention will be explained by referring to FIG. 3 (FIG. 1 as needed). Here, FIG. 3 is a block diagram showing a control system of a pressure regulator according to the first embodiment of the present invention.

Figure 3:
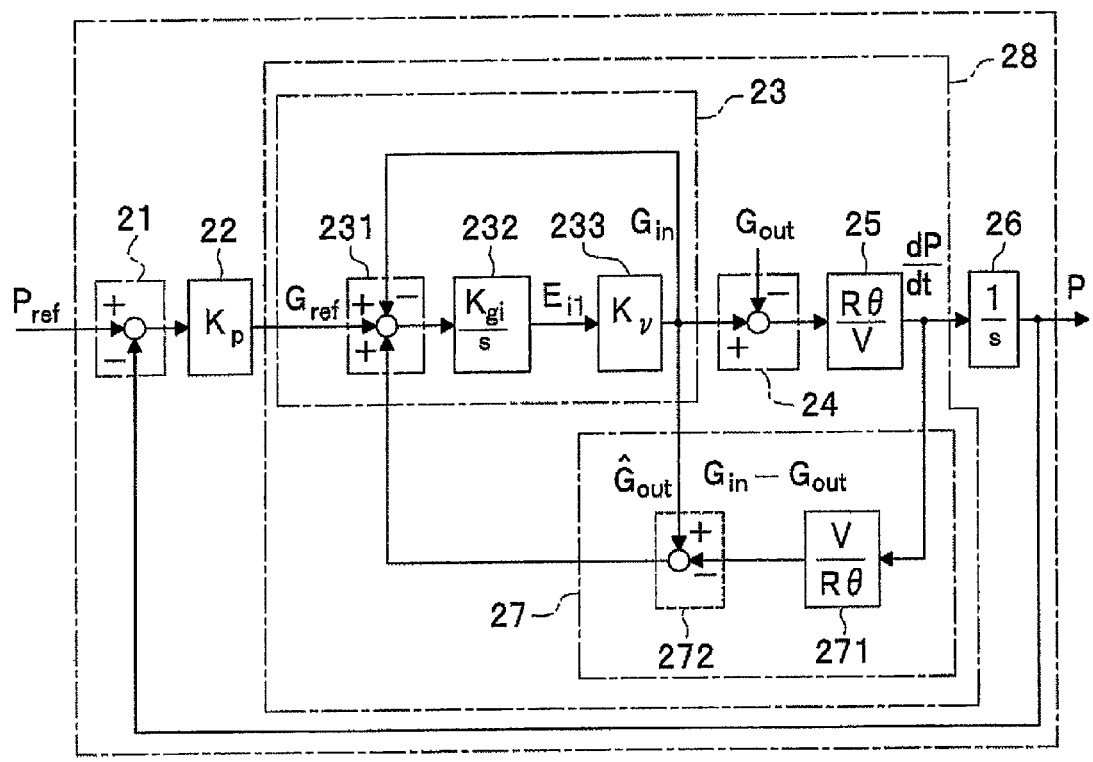
FIG. 3 is a block diagram showing a control system of a pressure regulator according to the first embodiment.

As shown in FIG. 3, a control system of the pressure regulator 1 according to the first embodiment of the present invention configures a pressure control system 20 as a main loop, which executes PI (proportional action, integral action) control by feeding back a pressure P of air in the isothermal pressure vessel 13 to a target setting pressure Pref.

In the main loop, an inflow rate control system 23 which feedback-controls the inflow rate Gin of air flowing into the isothermal pressure vessel 13 via the servo valve 11 is configured as one minor loop, and a model follow-up control system 28 which configures an observer (outflow rate estimating means) 27 for estimating an outflow rate Gout flowing out from the isothermal pressure vessel 13 based on the inflow rate Gin and a pressure differential value dP/dt of air in the isothermal pressure vessel 13 and compensates by feeding back the outflow rate Gout (hat thereon) estimated by the observer 27 to the inflow rate control system 23 is configured as another minor loop.

In the pressure control system 20, a deviation from the target value Pref is calculated in an adding node 21 by feeding back the pressure P, which is a control variable.

The calculated deviation of the pressure is transmitted to a control element 22 and a PI control, in which a proportional gain is Kp, is executed by the control element 22. Through this, a target value of inflow rate of air to be flown into the isothermal pressure vessel 13 for canceling the deviation of the pressure P is calculated and it becomes a target value Gref of the inflow rate Gin which is a control variable of an inflow rate control system 23. It is noted that a PID (proportional action, Integral action, Differential action) control may be adopted instead of the PI control for the control element 22 of the pressure control system 20.

The inflow rate control system 23 is a cascade loop configured in the pressure control system 20 which is a main loop, and feedback-controls the inflow rate Gin.

In the inflow rate control system 23, first, the inflow rate Gin measured by the flow meter 12 is fed back, and in an adding node 231, a deviation from the target value Gref of inflow rate, which is an output of the control element 22, is calculated. In addition, an estimate value Gout (hat thereon) of outflow rate output by the observer 27 is added to the adding node 231, and a deviation of the inflow rate Gin counting the estimate value Gout (hat thereon) of outflow rate is calculated.

The deviation of the inflow rate Gin calculated in the adding node 231 is transmitted to a control element 232, and multiplied by an integral gain Kgi by the control element 232 to calculate the control voltage Ei1 of the servo valve 11, which gives an inflow rate Gin for canceling the deviation of the inflow rate Gin. The control voltage Ei1 is transmitted to the servo valve 11 via the D/A converter 18, and the servo valve 11 opens the valve thereof with a gate opening degree corresponding to the control voltage Ei1 so that air flows into the isothermal pressure vessel 13.

Meanwhile, when a spool type servo valve is used for the servo valve 11, as shown in formula (4), there exists approximately a linear relation between the control voltage Ei1 and the inflow rate Gin, where Kv is a voltage-flow gain.

$$Gin = Kv \cdot Ei1 \tag{4}$$

Therefore, it is possible to obtain the inflow rate Gin by the formula (4) using the control voltage Ei1 instead of measurement of the inflow rate Gin by the flow meter 12.

As described above, accuracy of the pressure control using the pressure control system 20 can be improved by compensating a non-linearity deviated from the linear relation of the voltage-flow characteristic by feedback-controlling the inflow rate Gin.

If the control voltage Ei1 is transmitted to the servo valve 11, air of inflow rate Gin corresponding to the control voltage Ei1 flows into the isothermal pressure vessel 13 from the inlet 13a, while the outflow rate Gout flowing out from the outlet 13b via the channel 19d which is connected to an external equipment is added as a disturbance. In FIG. 3, the disturbance is expressed by an adding node 24.

In addition, for conducting the pressure control with fast response and high accuracy, it is required to compensate the outflow rate Gout in the pressure control system 20.

The outflow rate Gout may be measured and detected by connecting a flow meter in the downstream of the outlet 13b of the isothermal pressure vessel 13. However, if the flow meter is connected, since a pressure loss due to the flow meter causes a new disturbance, the connection of the flow meter does not always contribute to the pressure control with fast response and high accuracy. For example, even if a laminar flow meter which has a low pressure loss is adopted, since a pressure loss of several hundred Pa is caused by a laminar resistance pipe, installation of the flow meter in the downstream is not favorable.

Therefore, in the present invention, an observer 27 is disposed, in which the outflow rate Gout is estimated based on a pressure differential value dP/dt to be measured by the pressure differentiator 15 which has a lower pressure loss than a flow meter and the inflow rate Gin.

Here, a method for estimating the outflow rate Gout will be explained.

First, a relation among an inflow rate Gin flowing into the isothermal pressure vessel 13 from the servo valve 11, an outflow rate Gout flowing out from the isothermal pressure vessel 13, and a pressure P in the isothermal pressure vessel 13 will be explained.

A state equation of gas is written in formula (5), where, V indicates a capacity of an isothermal pressure vessel and W indicates a mass of air in the isothermal pressure vessel.

$$PV = WR\theta \tag{5}$$

If the formula (5) is differentiated, formula (6) is obtained, where, G=dW/dt.

$$P\frac{dV}{dt} + \frac{dP}{dt}V = GR\theta + WR\frac{d\theta}{dt} \tag{6}$$

Here, considering that air in the isothermal pressure vessel 13 changes isometrically (dV/dt=0) and isothermally (dθ/dt=0), a relation given by formula (7) exists among the inflow rate Gin and outflow rate Gout for the isothermal pressure vessel 13 and the pressure P in the isothermal pressure vessel 13.

$$G_{in} - G_{out} = \frac{V}{R\theta}\frac{dP}{dt} \tag{7}$$

Therefore, based on the inflow rate Gin and the pressure differential value dP/dt in the isothermal pressure vessel 13, an estimate value Gout (hat thereon) of outflow rate can be calculated by formula (8).

$$\hat{G}_{out} = G_{in} - \frac{V}{R\theta}\frac{dP}{dt} \tag{8}$$

Then, the observer 27 calculates "Gin-Gout" by multiplying the pressure change (pressure differential value) dP/dt accompanying the inflow rate Gin and the outflow rate Gout by V/(Rθ) using a control element 271, and calculates an estimate value Gout (hat thereon) of outflow rate by subtracting V/(Rθ)×dP/dt from the inflow rate Gin in an adding node 272.

By configuring a model follow-up system 28 where the estimate value Gout (hat thereon) of outflow rate is fed back to the adding node 231 of the inflow rate control system 23, a pressure regulator 1 with fast response and resistant to disturbances which conducts a pressure control corresponding to a small change of flow rate in the downstream can be configured.

It is noted that the pressure differential value dP/dt can also be obtained by discrete-differentiating (numerical differentiation) the pressure P measured by the pressure gauge 14. However, in the discrete-differentiation of the pressure P, a large noise component is included for a small pressure change. Therefore, it is difficult to obtain a good feedback signal, thereby measurement of the dP/dt is preferably conducted by disposing the pressure differentiator 15.

A calculation of the pressure control system 20 of the pressure regulator 1 described above is executed by the computer 16 and the control voltage Ei1 calculated by the computer 16 is transmitted to the servo valve 11 via the D/A converter 18, accordingly, air in the isothermal pressure vessel 13 can be controlled at a predetermined constant pressure.

Meanwhile, the calculation of the pressure control system 20 may be executed by, for example, a general-purpose computer such as a PC (Personal Computer), or by a specific arithmetic circuit.

Operation of Pressure Regulator

Next, operations of the pressure regulator 1 will be explained by referring to FIG. 1.

First, the pressure regulator 1 is activated, and assumes that a pressure P of air in the isothermal pressure vessel 13 is being stabilized at a predetermined target value Pref. In this case, a gate opening degree of the servo valve 11 is adjusted to balance an outflow rate Gout flowing out from the outlet 13b of the isothermal pressure vessel 13 with an inflow rate Gin flowing into the isothermal pressure vessel 13 from the inlet 13a.

Here, when a pressure P in the isothermal pressure vessel 13 deviates from the target value Pref due to a change of a pressure Ps of the gas supply source 10 or a change of outflow rate Gout flowing out from the isothermal pressure vessel 13, the pressure regulator 1 conducts the following operations by the computer 16 to compensate the deviation of the air pressure. The pressure regulator 1 receives an inflow rate Gin measured by the flow meter 12, a pressure P measured by the pressure gauge 14, and a pressure differential value dP/dt measured by the pressure differentiator 15 via the A/D converter 17, and based on the received these measured data, calculates a control voltage Ei1 for the servo valve 11 and transmits the calculated control voltage Ei1 to the servo valve 11 via the D/A converter 18.

The servo valve 11 adjusts the valve at a gate opening degree corresponding to the control voltage Ei1 calculated by the computer 16, and air is flown into the isothermal pressure vessel 13 with an inflow rate Gin corresponding to the gate opening degree. Through the processes described above, the pressure p of air in the isothermal pressure vessel 13 is controlled to be stabilized at the target value Pref.

Second Embodiment

Figure 4:
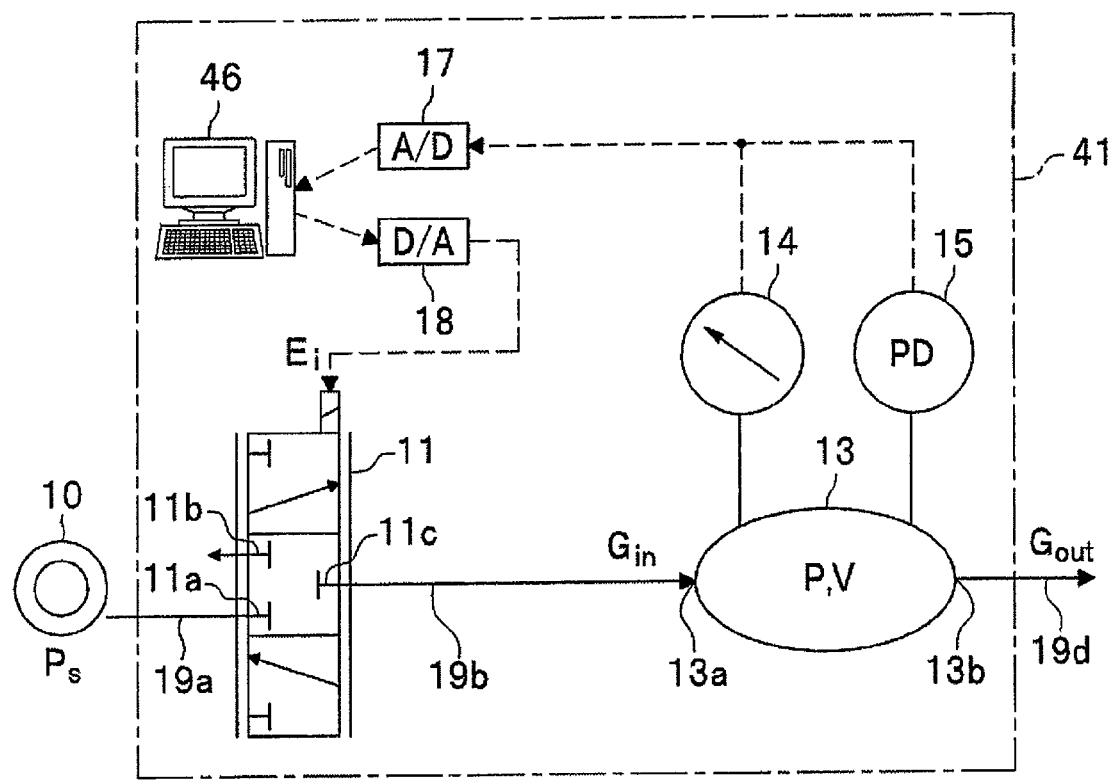
FIG. 4 is a configuration diagram schematically showing a configuration of a pressure regulator according to a second embodiment of the present invention.

FIG. 4 is a configuration diagram schematically showing a configuration of a pressure regulator according to a second embodiment of the present invention. It is noted that in FIG. 4, equipment and a part identical to those of the pressure regulator 1 shown in FIG. 1 is labeled the same symbol.

A pressure regulator 41 shown in FIG. 4 has a configuration identical to that of the pressure regulator 1 according to the first embodiment except that the flow meter 12 is not installed in the channel 19b between the servo valve 11 and the isothermal pressure vessel 13 and that an arithmetic computation of a computer 46 is different from that of the computer 16. Then, explanations of the servo valve 11, isothermal pressure vessel 13, pressure gauge 14, pressure differentiator 15, A/D (Analog/Digital) converter 17, D/A (Digital/Analog) converter 18, and channels 19a, 19b, 19d will be omitted.

The pressure regulator 41 according to the second embodiment of the present invention maintains air which flows out from the outlet 13b of the isothermal pressure vessel 13 via the channel 19d at a predetermined constant pressure by regulating an inflow rate of air, which is supplied from the gas supply source 10, flowing into the isothermal pressure vessel 13 by the servo valve 11.

In addition, in the second embodiment of the present invention, as with the first embodiment, air is used as a sample of the compressive fluid for the explanation.

However, the explanation may be applied to a compressive fluid other than air, represented by a gas such as nitrogen, hydrogen, carbon dioxide and the like.

It is noted that meanings of main symbols (fc, Gin, Gout, Kgi, Kp, Kv, L, P, Pc, Pj, Pref, Ps, R, r1, r2, T, V, Vd, θ, μ, ρa) to be used for the explanation of the second embodiment of the present invention are the same as before.

Computer

In the second embodiment of the present invention, the computer (pressure control means) 46 receives a detection signal of pressure P of air in the isothermal pressure vessel 13 measured by the pressure gauge 14 and a detection signal of differential value dP/dt of pressure P in the isothermal pressure vessel 13 measured by the pressure differentiator 15 as digital signals via the A/D converter 17, and based on the detected signals, transmits a control voltage Ei2 for controlling the inflow rate Gin (include "negative inflow rate", where air flows out from outlet port 11b of servo valve 11) of air flowing into the isothermal pressure vessel 13 via the servo valve 11.

In the computer 46 according to the second embodiment of the present invention, a calculation for controlling opening/closing or gate opening degree of the servo valve 11 is executed by using the pressure P of air in the isothermal pressure vessel 13 measured by the pressure gauge 14 and the pressure differential value dP/dt of air in the isothermal pressure vessel 13 measured by the pressure differentiator 15 as needed.

Pressure Control Method

Next, a pressure control using the pressure regulator 41 according to the second embodiment of the present invention will be explained by referring to FIG. 5 (FIG. 4 as needed). Here, FIG. 5 is a block diagram showing a control system of a pressure regulator according to the second embodiment of the present invention.

Figure 5:
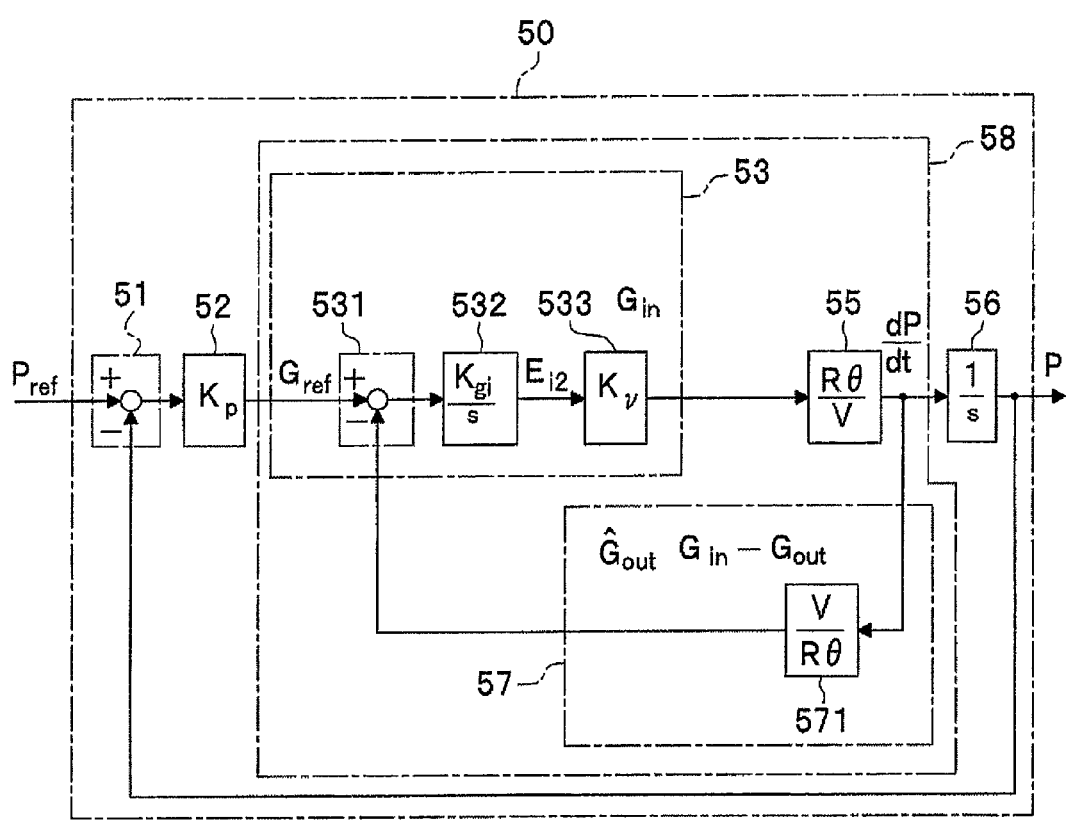
FIG. 5 is a block diagram showing a control system of a pressure regulator according to the second embodiment.

As shown in FIG. 5, a control system of the pressure regulator 41 according to the second embodiment of the present invention configures a pressure control system 50 as a main loop, which executes PI (Proportional action, Integral action) control by feeding back a pressure P of air in the isothermal pressure vessel 13 to a target pressure Pref.

In the main loop, a model follow-up control system 58 which configures an observer (outflow rate estimating means) 57 for estimating an outflow rate Gout (hat thereon) flowing out from the isothermal pressure vessel 13 based on a pressure differential value dP/dt of air in the isothermal pressure vessel 13 and compensates by feeding back the outflow rate Gout (hat thereon) estimated by the observer 57 to the inflow rate control system 53 is configured as a minor loop.

In the pressure control system 50, a deviation from the target value Pref is calculated in an adding node 51 by feeding back the pressure P, which is a control variable.

The calculated deviation of the pressure is transmitted to a control element 52, and a PI control, in which a proportional gain is Kp, is executed by the control element 52. Through this, a target value of inflow rate of air to be flown into the isothermal pressure vessel 13 for canceling the deviation of the pressure P is calculated and the target value becomes a target value Gref of the inflow rate Gin, which is a control variable of the inflow rate control system 53. It is noted that a PID (Proportional action, Integral action, Differential action) control may be used instead of the PI control for the control element 52 of the pressure control system 50.

The inflow rate control system 53 is a cascade loop configured in the pressure control system 50, which is a main loop, and feedback-controls the inflow rate Gin.

In the inflow rate control system 53, a deviation from the target value Gref of inflow rate, which is an output of the control element 52, is calculated in an adding node 531. In addition, an estimate value Gout (hat thereon) of outflow rate, which is output by the observer 57, is added to the adding node 531, and a deviation of the inflow rate Gin counting the estimate value Gout (hat thereon) of outflow rate is calculated.

The deviation of the inflow rate Gin calculated in the adding node 531 is transmitted to a control element 532, and multiplied by an integral gain Kgi by the control element 532 to calculate the control voltage Ei2 of the servo valve 11, which gives an inflow rate Gin for canceling the deviation of the inflow rate Gin. The control voltage Ei2 is transmitted to the servo valve 11 via the D/A converter 18, and the servo valve 11 opens the valve at a gate opening degree corresponding to the control voltage Ei2 so that air is flown into the isothermal pressure vessel 13.

Meanwhile, when a spool type servo valve is used for the servo valve 11, as shown in formula (4), there exists approximately a linear relation between the control voltage Ei2 and the inflow rate Gin, where Kv is a voltage-flow gain.

$$Gin = Kv \cdot Ei2 \quad (4)$$

Therefore, it is possible to obtain the inflow rate Gin by the formula (4) using the control voltage Ei2.

As described above, accuracy of the pressure control using the pressure control system 50 can be improved by compensating a non-linearity deviated from the linear relation of the voltage-flow characteristic by feedback-controlling the inflow rate Gin.

If the control voltage Ei2 is transmitted to the servo valve 11, air of inflow rate Gin corresponding to the control voltage Ei2 flows into the isothermal pressure vessel 13 from the inlet 13a, while the outflow rate Gout flowing out from the outlet 13b via the channel 19d which is connected to an external equipment is added as a disturbance.

For achieving a pressure control with fast response and high accuracy, it is required to compensate the outflow rate Gout in the pressure control system 50.

In the second embodiment of the present invention, the observer 57 is disposed, which estimates an outflow rate Gout based on a pressure differential value dP/dt to be measured by the pressure differentiator 15 which has a lower pressure loss than a flow meter.

Here, a method for estimating an outflow rate Gout in the second embodiment of the present invention will be explained.

First, a relation among an inflow rate Gin flowing into the isothermal pressure vessel 13, an outflow rate Gout flowing out from the isothermal pressure vessel 13, and a pressure P in the isothermal pressure vessel 13 will be explained.

A state equation of air is written in formula (5) as before, where V indicates a capacity of the isothermal pressure vessel 13 and W indicates a mass of air in the isothermal pressure vessel 13.

$$PV = WR\theta \quad (5)$$

If the formula (5) is differentiated, formula (6) is obtained.

Here, considering that air in the isothermal pressure vessel 13 changes isometrically (dV/dt=0) and isothermally (dθ/dt=0), there exists a relation given by formula (7) among the inflow rate Gin and outflow rate Gout of the isothermal pressure vessel 13 and the pressure P in the isothermal pressure vessel 13.

Then, the observer 57 can calculate "Gin-Gout" by multiplying a pressure change (pressure differential value) dP/dt accompanying the inflow rate Gin and the outflow rate Gout by V/(Rθ) using the control element 571.

By configuring a model follow-up system 58 where an inflow/outflow rate "Gin-Gout" is fed back to an adding node 531 of the inflow rate control system 53, a pressure regulator 1 with fast response and resistant to disturbances which conducts a pressure control corresponding to a small change of flow rate in the downstream can be configured.

It is noted that a pressure differential value dP/dt can also be obtained by discrete-differentiating (numerical differentiation) a pressure P to be measured by the pressure gauge 14. However, in the discrete-differentiation of the pressure P, a large noise component is included for a small pressure change. Therefore, it is difficult to obtain a good feedback signal, thereby measurement of the dP/dt is preferably conducted by installing the pressure differentiator 15.

A calculation of the pressure control system 50 of the pressure regulator 1 described above is executed by the computer 46 and the control voltage Ei2 calculated by the computer 46 is transmitted to the servo valve 11 via the D/A converter 18. Accordingly, air in the isothermal pressure vessel 13 can be controlled at a predetermined constant pressure.

Meanwhile, a calculation of the pressure control system 50 may be executed by, for example, a general-purpose computer such as a PC (Personal Computer), or by a specific arithmetic circuit.

Operation of Pressure Regulator

Next, operations of the pressure regulator 41 will be explained by referring to FIG. 4.

First, the pressure regulator 41 is activated, and assumes that a pressure P of air in the isothermal pressure vessel 13 is being stabilized at a predetermined target value Pref. In this case, a gate opening degree of the servo valve 11 is adjusted to balance an outflow rate Gout flowing out from the outlet 13b of the isothermal pressure vessel 13 with an inflow rate Gin flowing into the isothermal pressure vessel 13 from the inlet 13a.

Here, when the pressure P in the isothermal pressure vessel 13 deviates from the target value Pref due to a change of a pressure Ps of the gas supply source 10 or a change of outflow rate Gout flowing out from the isothermal pressure vessel 13, the pressure regulator 41 conducts the following operations by the computer 46 for compensating the deviation of the air pressure. That is, the pressure regulator 41 receives a pressure P measured by the pressure gauge 14 and a pressure differential value dP/dt measured by the pressure differentiator 15 via the A/D converter 17, and based on the received these measured data, calculates a control voltage Ei2 for the servo valve 11 and transmits the calculated control voltage Ei2 to the servo valve 11 via the D/A converter 18.

The servo valve 11 adjusts the valve at a gate opening degree corresponding to the control voltage Ei2 calculated by the computer 46, and air is flown into the isothermal pressure vessel 13 with an inflow rate Gin corresponding to the gate opening degree. Through the processes described above, the pressure p of air in the isothermal pressure vessel 13 is controlled to be stabilized at the target value Pref.

EXPERIMENTAL EXAMPLE

Next, experimental results of a response evaluation against a pressure change in the upstream and outflow rate change in the downstream of the pressure regulator 1 according to the present invention will be explained.

Configuration of Pressure Regulator

A pressure regulator shown in FIG. 1 was configured.

A detailed specification of each component will be described below.

Servo Valve 11

As a spool type servo valve, MYPE-5-M5-SA with five ports manufactured by FESTO AG & Co. KG was adopted.

Two ports being not used were sealed and three ports were used for an inlet, outlet, and control.

Isothermal Pressure Vessel 13

A vessel manufactured by TOKYO METER Co., LTD. was adopted. A capacity of the vessel is $1.0 \times 10^{-3}$ [m$^3$] and 5% by volume of cupper wire of 50 [μm] in diameter was filled in the vessel. Meanwhile, a surface of the cupper wire was coated.

Flow Meter 12

A laminar flow meter, in which a laminar element is formed by inserting approximately 320 fine tubes of 0.5 [mm] in outer diameter, 0.3 [mm] in inner diameter, and 50 [mm] long, was adopted (refer to reference 1 in detail).

Pressure Gauge 14

As a pressure gauge, PD-64S500K manufactured by TOYOTA MACHINE WORKS, LTD. was adopted, which is a semiconductor type.

Pressure Differentiator 15

A pressure differentiator provided with a cylindrical slit flow path shown in FIG. 2 was adopted. An outer dimension r1 of the slit flow path is $r1=1.0 \times 10^{-2}$ [m], an inner dimension r2 is $r22=0.99 \times 10^{-2}$ [m], a flow path length L is $L=2.5 \times 10^{-2}$ [m], and a capacity Vd of isothermal pressure vessel is $Vd=8.06 \times 10^{-6}$ [m$^3$]. A theoretical value of cutoff frequency fc is 67 [Hz] at pressure P is P=300 [kPa] from formula (3). A differential manometer whose measurement range is ±1 inch H$_2$O (249 [Pa]) manufactured by All Sensors Corp. was adopted. Through preliminary experiments generating a pulsation flow of sine-wave, it was confirmed that the pressure differentiator sufficiently responded up to 30 [Hz].

Control Parameter Setting

Control parameters were set as follows.

Assuming that a control of inflow rate Gin is sufficiently faster than the pressure control in the block diagram shown in FIG. 3, a transfer function of pressure control is written as formula (9).

$$\frac{P}{P_{ref}} = \frac{1}{1+T_p s} = \frac{1}{1+\dfrac{V}{K_p R \theta}s} \quad (9)$$

A target of stabilization time (time to reach 95% of target value) for pressure recovery when a disturbance such as a pressure change in the upstream or downstream occurs was set within 0.3 [s], and $Kp=1.19 \times 10^{-7}$ [kg/(Pa·s)] was set as a proportional gain of the pressure control system 20 so that Tp becomes Tp=0.1 [s].

Next, in the inflow rate control system 23, if an input from the control element 22 of the pressure control system 20 is indicated by Gref, a flow gain for the control voltage Ei1 of the servo valve 11 is indicated by Kv, and an integral gain of the inflow rate control system 23 is indicated by Kgi, a transfer function of inflow rate control is written as formula (10).

$$\frac{G_{in}}{G_{ref}} = \frac{1}{1+T_G s} = \frac{1}{1+\dfrac{1}{K_v K_{g_i}}s} \quad (10)$$

To be exact, Kv is non-linear. However, in the spool type servo valve 11 used in the experiments, the Kv was approximated to be linear by $Kv=2.155 \times 10^{-4}$ [kg/(s·V)] under the experimental condition that a supply pressure Ps in the upstream of the servo valve 11 is Ps=500 [kPa(abs)] and a pressure P in the downstream is P=300 [kPa(abs)] based on static characteristics measured in advance. Since a loop of the inflow rate control system 23 is a minor loop of the loop of the pressure control system 20, the control cycle is required to be sufficiently faster than that of the pressure control system 20. Therefore, Kgi was set to $Kgi=6.19 \times 10^5$ [s$^2$ V/kg] so that Tgi becomes Tgi=0.0075 [s] (Tp:TG=15:1). In experiment 2 described later, Pref is also set to Pref=300 [kPa(abs)].

For comparison, experiments were conducted using an accurate regulator (pilot type pressure regulator) and electropneumatic regulator in the marketplace instead of the pressure regulator 1 of the present invention.

Accurate Regulator

IR2010-02G manufactured by SMC Corporation was adopted. (Electropneumatic Regulator)

ITV2050-212BL5 manufactured by SMC Corporation was adopted.

Experiment 1

Experiment on Pressure Change in Upstream

In experiment 1, a pressure change was generated in the upstream of the pressure regulator 1, and a stabilizing behavior of the pressure change by the pressure regulator 1 was measured.

Figure 6:
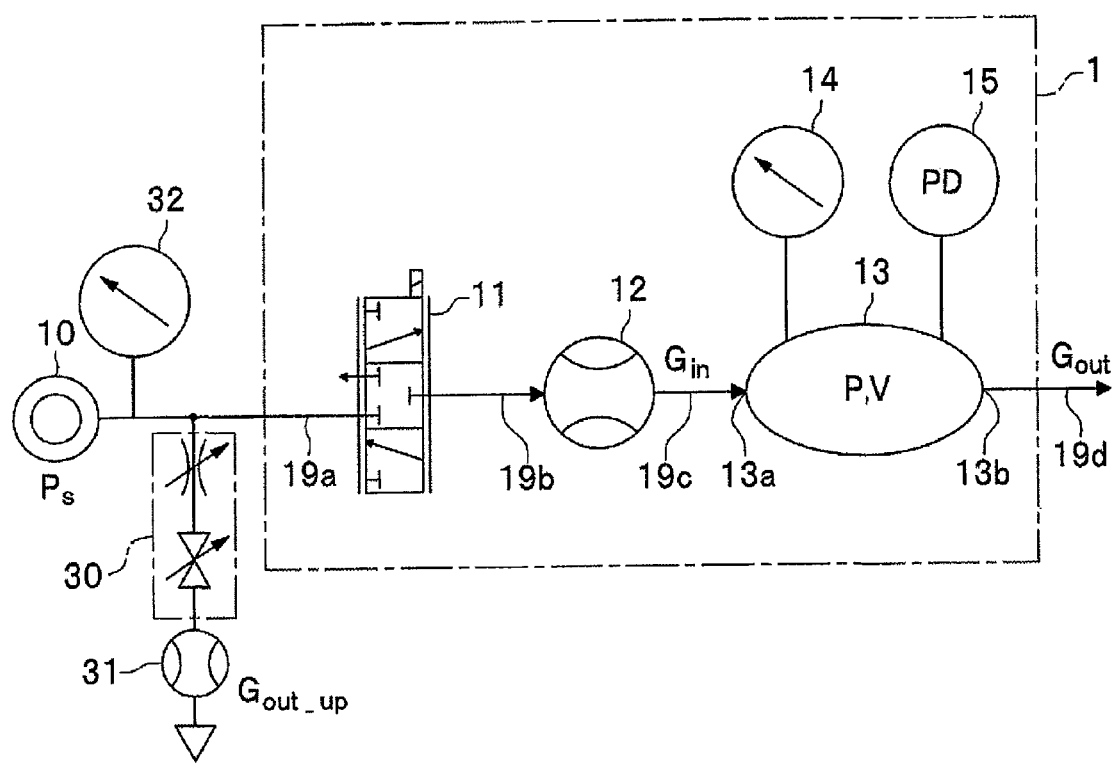
FIG. 6 is a configuration diagram schematically showing a configuration of an experimental apparatus of a first experiment.

As shown in FIG. 6, the experimental apparatus was provided with a branch channel 30 and a pressure gauge 32 in the channel 19a which connects the gas supply source 10 and the servo valve 11 in comparison with the pressure regulator 1 shown in FIG. 1. A discharge rate Gout_up from the branch channel 30 can be adjusted by a variable throttle and a laminar flow meter 31 was disposed in the downstream of the branch channel 30. A supply pressure Ps was changed by discharging a part of air to be supplied to the servo valve 11 through the branch channel 30.

The discharge rate Gout_up and the pressure Ps of air to be supplied to the servo valve 11 were measured by the flow meter 31 and the pressure gauge 32, respectively.

Meanwhile, in FIG. 6, drawings of the computer 16 which is a control means of the pressure regulator 1, the A/D converter 17, and the D/A converter 18 (see FIG. 1) were omitted. In addition, data measured by the pressure gauge 32 and the flow meter 31 of the experimental apparatus were transmitted to the computer 16 via the A/D converter 17 and processed by the computer 16 together with data measured by the flow meter 12, the pressure gauge 14, and the pressure differentiator 15.

Experimental Operation

Figure 7:
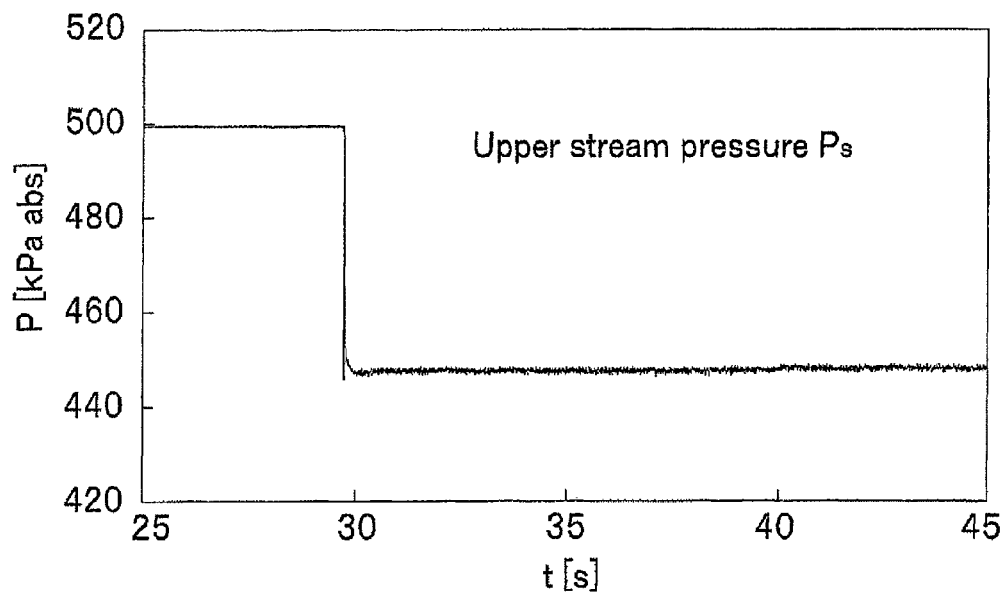
FIG. 7 is a graph showing a change of supply pressure in the first experiment.

In the experimental apparatus shown in FIG. 6, after the pressure P was sufficiently stabilized, a hand valve of the branch channel 30 located in the upstream of the servo valve 11 was opened at t≧30 [s], and air of Gout_up=$6.47 \times 10^{-3}$ [kg] was discharged. A change of the supply pressure Ps at the time is shown in FIG. 7. In addition, for comparison, similar experiments were conducted using the accurate regulator and electropneumatic regulator in the marketplace described above.

Experimental Result

Figure 8:
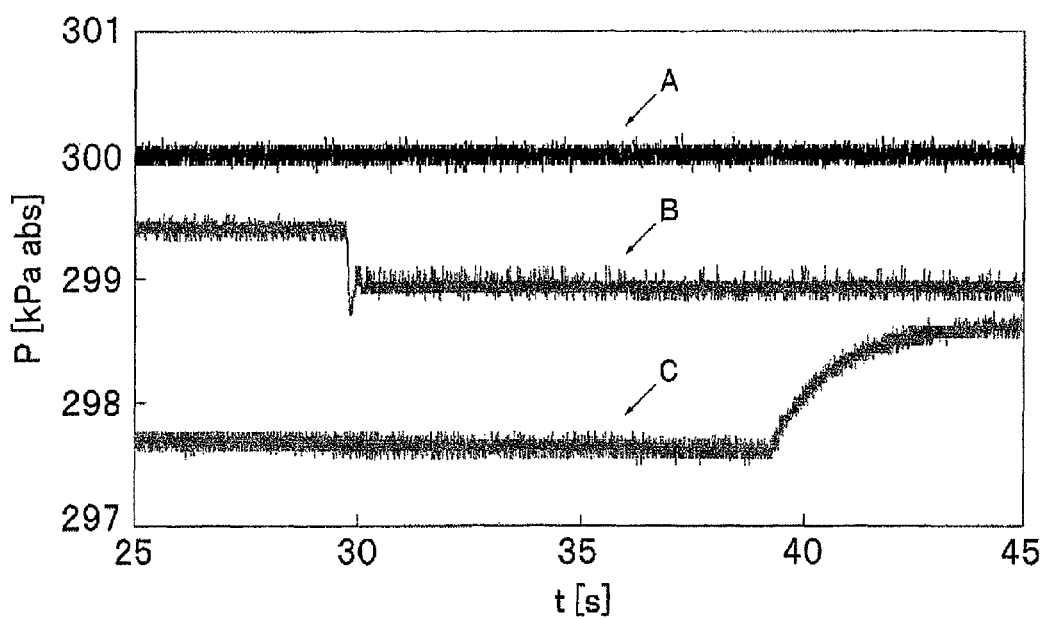
FIG. 8 is a graph showing results of the first experiment.

FIG. 8 is a graph showing experimental results of the experiment 1. In FIG. 8, "A" indicates a pressure change in the case when the pressure regulator 1 according to the present invention was used, "B" indicates the pressure change in the case of using the accurate regulator, and "C" indicates the pressure change in the case of using the electropneumatic regulator.

As shown in FIG. 8, when the pressure regulator 1 according to the present invention is used, the pressure P is stabilized at a target value 300 [kPa] without deviation, and substantially free from effect of the change of the supply pressure Ps. In contrast, when the accurate regulator or electropneumatic regulator was used, a constant offset against the target pressure value is observed. When the accurate regulator is used, the pressure P in the downstream is also lowered by lowering of the supply pressure Ps. On the other hand, when the electropneumatic regulator is used, effect of the change of the supply pressure Ps is not observed. However, the pressure P is increased at t≧39 [s]. This may be caused by starting of a regulator switch due to lowering of the supply pressure Ps below a threshold value of the electropneumatic regulator at t=39 [s].

Experiment 2

Experiment on Outflow Rate Change in Downstream

In experiment 2, a change of flow rate (outflow rate) was generated in the downstream of the pressure regulator 1, and a behavior of pressure stabilization by the pressure regulator 1 was measured.

Figure 9:
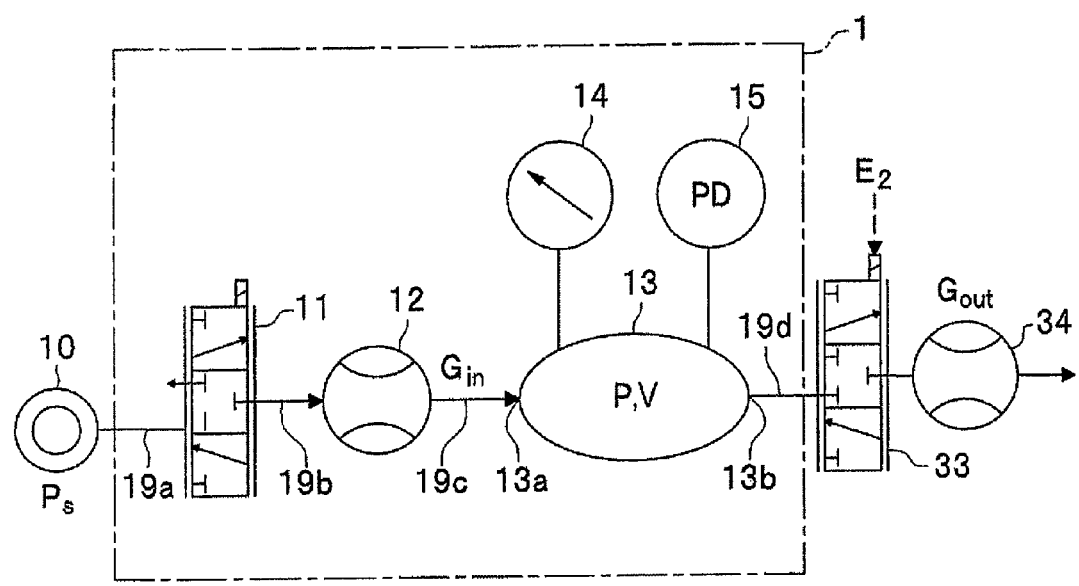
FIG. 9 is a configuration diagram schematically showing a configuration of an experimental apparatus in a second experiment.

In the experimental apparatus, as shown in FIG. 9, a spool type servo valve 33 was connected to a downstream end of the channel 19d on the output side of the pressure regulator 1, and further a laminar flow meter 34 was connected on the downstream side of the servo valve 33 in comparison with the pressure regulator shown in FIG. 1. An outflow rate Gout was changed by giving a control voltage E2 to the servo valve 33 for adjusting a gate opening degree of the servo valve 33. The outflow rate Gout was measured by the flow meter 34.

Meanwhile, in FIG. 9, drawings of the computer 16 which is a control means of the pressure regulator 1, the A/D converter 17, and the D/A converter 18 (see FIG. 1) were omitted. In addition, data measured by the flow meter 34 of the experimental apparatus were transmitted to the computer 16 via the A/D converter 17 and processed by the computer 16 together with data measured by the flow meter 12, the pressure gauge 14, and the pressure differentiator 15. Further, the control voltage E2 for the servo valve 33 was transmitted by the computer 16 via the D/A converter 18 to operate the servo valve 33.

Experimental Operation

In the experimental apparatus shown in FIG. 9, the control voltage E2 for the servo valve 33, which was installed in the downstream of the pressure regulator 1, was changed in a step-like pattern as described below and a disturbance was generated in the downstream of the pressure regulator 1.

E2=6.5 [v], when t<20 [s]
E2=8.0 [v], when t≧20 [s]

Figure 10:
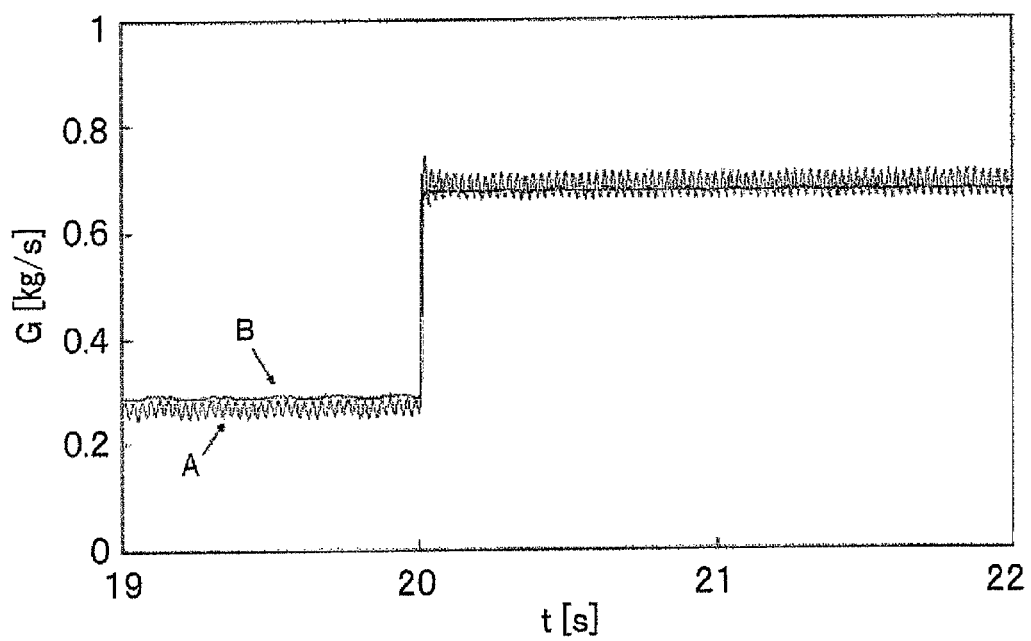
FIG. 10 is a graph showing a measured value and an estimated value of an outflow rate in the second embodiment.

FIG. 10 is a graph showing a measured value and estimate value of outflow rate in the experiment 2. In FIG. 10, "A" indicates an outflow rate Gout measured by the flow meter 34 and "B" indicates an estimate value Gout (hat thereon) of outflow rate estimated by the formula (8). In addition, in the experiment 2, similar experiments were also conducted for comparison by using the accurate regulator and electropneumatic regulator in the marketplace described above.

Experimental Result

Figure 11:
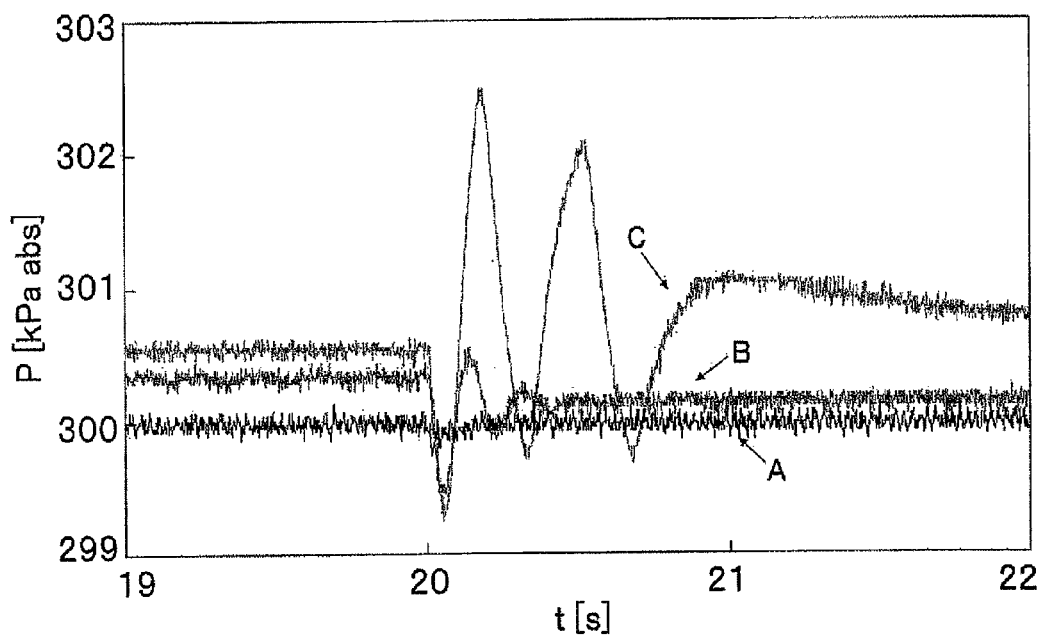
FIG. 11 is a graph showing experimental results of the second experiment.

FIG. 11 is a graph showing experimental results of the experiment 2. In FIG. 11, "A" indicates a pressure change in the case when the pressure regulator 1 according to the present invention was used, "B" indicates the pressure change in the case of using the accurate regulator, and "C" indicates the pressure change in the case of using the electropneumatic regulator.

In the results of the experiment 2, when the pressure regulator 1 according to the present invention is used, the pressure P is also stabilized at a target value 300 [kPa] without offset and effect of the disturbance in the downstream is rapidly compensated within 0.3 [s], thereby demonstrating superiority of the pressure regulator 1 according to the present invention to the regulators in the marketplace.

Experiment 3

Control Experiment Using Discrete-Differential Value of Measured Pressure Gauge Value In the experiment 3, the experimental apparatus shown in FIG. 9 was used. For calculating an estimate value Gout (hat thereon) of outflow rate using the formula (8), a pressure differential value obtained by discrete-differentiating a pressure P measured by the pressure gauge 14 was used instead of pressure differential vale dP/dt to be measured by the pressure differentiator 15. Meanwhile, a digital filter for discrete-differentiating the pressure P was an incomplete differentiator as with the pressure differentiator 15, and a cutoff frequency fc was 67 [Hz]. Other experimental conditions were the same with those of the experiment 2.

Experimental Results

Figure 12:
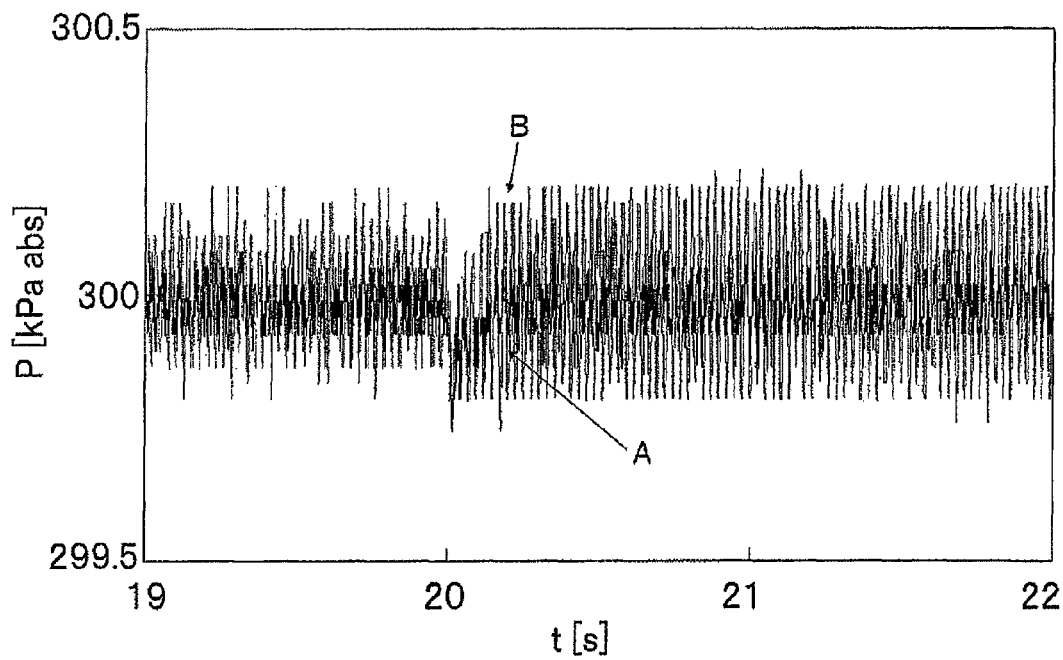
FIG. 12 is a graph showing experimental results of a third experiment.

FIG. 12 is a graph showing experimental results of the experiment 3. In FIG. 12, "A" indicates a result in the case when a pressure differential value measured by the pressure differentiator is used and "B" indicates a result in the case when a discrete-differential value of a measured pressure value by the pressure gauge is used.

As shown in FIG. 12, it can be seen that in the case when the discrete-differential value is used, a stationary fluctuation becomes large in comparison with the case when a measured value of the pressure differentiator was used. This may be caused by amplification of noise components through discrete-differentiation of the measured vale of the pressure gauge 14.

Figure 13:
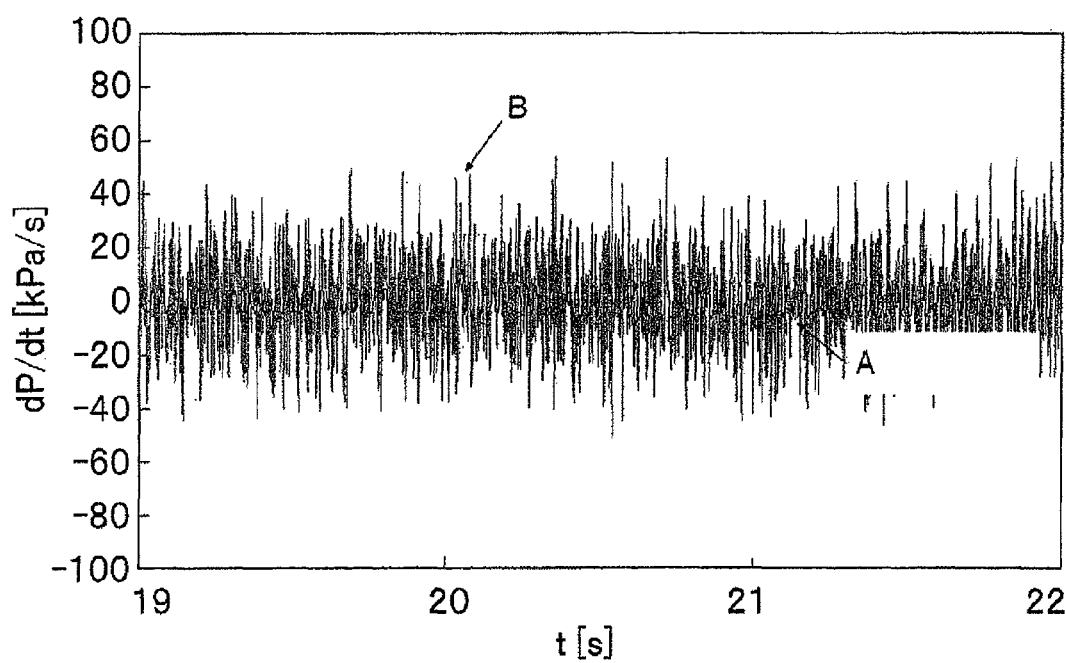
FIG. 13 is a graph showing a pressure differential value measured by a pressure differentiator and a pressure differential value obtained by discrete-differentiating a pressure value measured by a pressure gauge.

FIG. 13 is a graph showing a pressure differential value measured by a pressure differentiator and a pressure differential value obtained by discrete-differentiating a measured pressure value by a pressure gauge. In FIG. 13, "A" indicates a pressure differential value measured by the pressure differentiator and "B" indicates a pressure differential value obtained by discrete-differentiating the measured pressure value by the pressure gauge.

As shown in FIG. 13, it can be seen that a fluctuation of the pressure differential value measured by using the pressure differentiator 15 is smaller than that of the pressure differential value obtained by discrete-differentiating the measured value by the pressure gauge 14, and that the noise components of the pressure differential value measured by using the pressure differentiator 15 are smaller than those of the pressure differential value obtained by discrete-differentiating the measured value by the pressure gauge 14. Accordingly, it is understood that use of the pressure differentiator 15 is effective for controlling the pressure with high accuracy.

Configuration of Vibration Isolator

Next, as an application example of the pressure regulator 1 according to the present invention, an air spring vibration isolator 100 using the pressure regulator 1 will be explained by referring to FIG. 14. Here, FIG. 14 is a configuration diagram schematically showing a configuration of an air spring vibration isolator using a pressure regulator.

Figure 14:
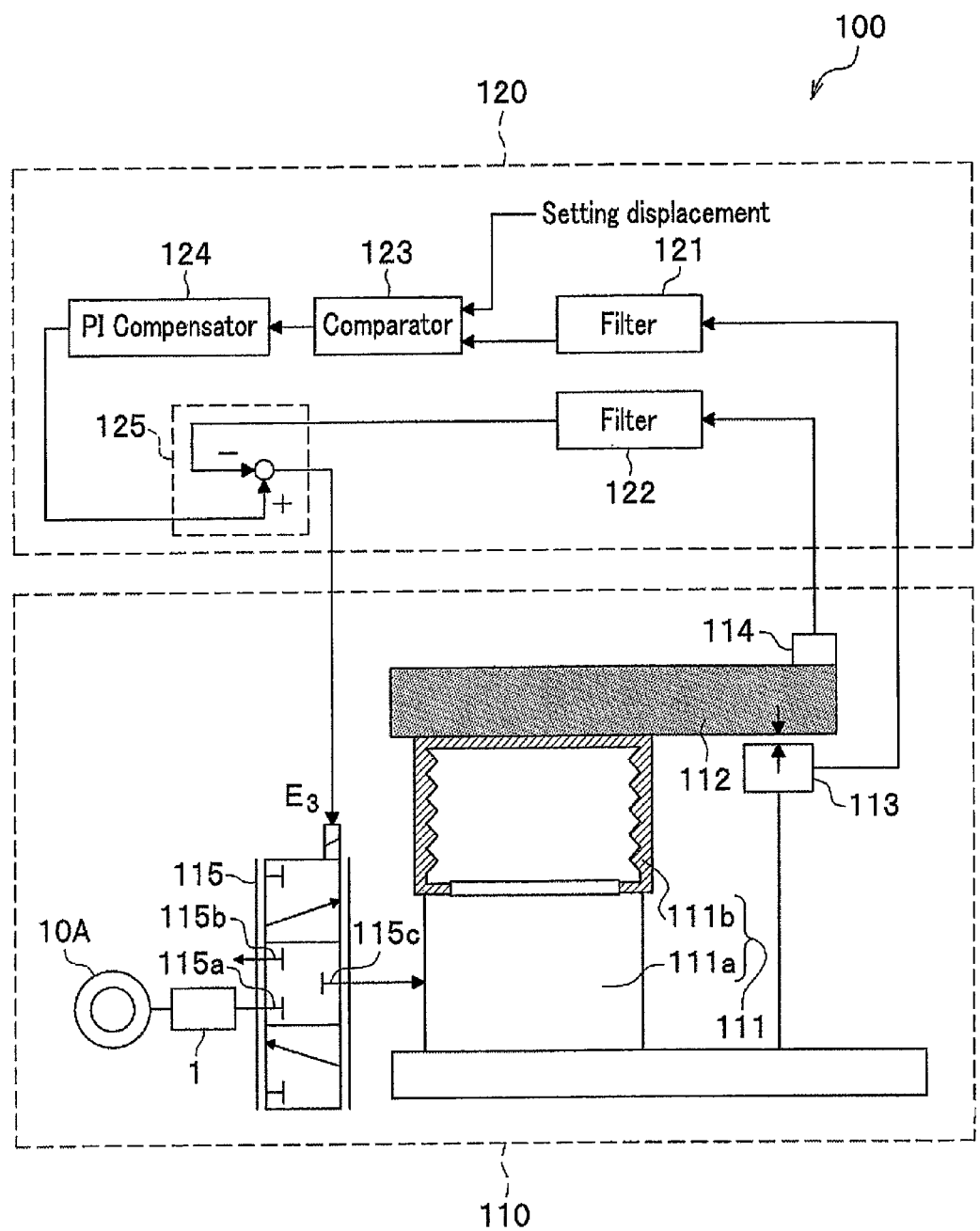
FIG. 14 is a configuration diagram schematically showing a configuration of an air spring vibration isolator using a pressure regulator according to the present invention.

As shown in FIG. 14, the vibration isolator 100 includes a vibration isolation table 110 and air spring control unit 120.

The vibration isolator 100 controls a position of a table 112 which displaces due to, for example, vibrations so as to stabilize the position within a setting displacement by regulating supply and discharge of air for an air spring 111. In addition, air to be supplied to the servo valve 115 is supplied from an air supply source 10A via the pressure regulator 1, thereby maintaining a constant pressure with high accuracy.

In the embodiment of the present invention, using the air spring control unit 120, a position and acceleration of the table 112 are feedback-controlled, a control voltage E3 for a servo valve 115 is calculated, and the servo valve 115 is operated.

Vibration Isolation Table

The vibration isolation table 110 includes the air supply source 10A, pressure regulator 1, servo valve 115, air spring 111, table 112, a position detector 113, and an acceleration detector 114.

The air supply source 10A is a supply source for supplying air to the air spring 111 and supplies compressed air using pumps such as a compressor. A cylinder filled with highly compressed air may also be used for supplying the air. Air supplied from the air supply source 10A is flown into the pressure regulator 1 to adjust the pressure to a predetermined value.

The pressure regulator 1 adjusts a pressure of air supplied from the air supply source 11A to a predetermined pressure and supplies the air to the air spring 111 via the servo valve 115, which is the same with the pressure regulator according to the present invention shown in FIG. 1.

The servo valve 115 regulates supply and discharge of air for the air spring 111. The servo valve 115 according to the embodiment shown in FIG. 14 is a spool type servo valve which has an inlet port 115a, an outlet port 115b, and a control port 115c, and a servo valve identical to the servo valve 11 of the pressure regulator 1 shown I FIG. 1 may be used for the servo valve 115.

For example, a nozzle-flapper type servo valve may be used for the servo valve 115 as long as the nozzle-flapper type servo valve can regulate the supply and discharge of air for the air spring 111. However, especially, a spool type servo valve which is a flow rate control type servo valve having a small discharge rate is preferably used for reducing an environmental load.

The control port 115c of the servo valve 115 is connected to the air spring 111, the inlet port 115a is connected to the pressure regulator 1, the outlet port 115b is opened to the atmosphere, and a connection switching between the control port 115c and the inlet port 115a or outlet port 115b and an adjustment of gate opening degree are conducted based on the control voltage E3 transmitted from the air spring control unit 120 via the D/A converter (not shown). Through the processes described above, the supply and discharge of air for the air spring 111 can be regulated.

The air spring 111 consists of a buffer tank portion 111a and a rubber bellows portion 111b, and which is an actuator, in which the rubber bellows portion 111b stretches depending on a pressure of air therein, for supporting the table 112 as a supporting leg.

The air spring 111 is connected to the control port 115c of the servo valve 115, and air for the air spring 111 is supplied or discharged depending on a connection direction and gate opening degree of the servo valve 115.

The table 112 is a placing table for placing equipment which is used under a vibration-free condition, such as a photolithography machine and the like. The table 112 is supported by the air spring 111, and the position (displacement) and acceleration of the table 112 are detected by the position detector 113 and acceleration detector 114.

The position detector 113 detects a position (displacement) of the table 112 and outputs the detected signal to the air spring control unit 120 via the A/D converter (not shown). As a position detector 113, for example, a position detection sensor which uses an eddy current displacement sensor, a capacitance sensor, or a photoelectric conversion device may be used.

The acceleration detector 114 detects an acceleration of the table 112 and outputs the detected signal to the air spring control unit 120 via the A/D converter (not shown). As an acceleration detector 114, for example, a piezoelectric control acceleration sensor, or a capacitance type acceleration sensor may be used.

Air Spring Control Unit

The air spring control unit (air spring control means) 120 includes a filter 121, a filter 122, a comparator 123, a PI compensator 124, and a subtractor 125, receives a position and acceleration of the table 112 measured by the position detector 113 and acceleration detector 114 of the vibration isolator table 110 via an A/D converter (not shown), calculates a control voltage E3 for the servo valve 115 by feedback-controlling the received position and acceleration, and transmits E3 to the servo valve 115 via the D/A converter (not shown). Through the processes described above, the position of the table 112 is stabilized within a setting displacement, and the servo valve 115 is controlled so as to suppress a change of the acceleration in minimum.

The air spring control unit 120 can be configured using a computer, as with a control system of the pressure regulator 1. In addition, the computer 16 (see FIG. 1) of the pressure regulator 1 may also be used in combination as a computer of the air spring control unit 120.

The filter 121 executes a filtering processing of a position signal of the table 112 detected by the position detector 113 with an appropriate amplification and time constant, and outputs to the comparator 123.

The filter 122 executes a filtering processing of an acceleration signal of the table 112 detected by the acceleration detector 114 with an appropriate amplification and time constant, and outputs to the subtractor 125.

The comparator 123 compares a setting displacement, which is a target value of a position of the table 112, with a position signal (displacement signal) of the table 112 which is filtering-processed by the filter 121, calculates a deviation of the position signal from the setting displacement, and outputs to the PI compensator 124.

Based on the deviation, which is a control variable of the PI control, of the table 112, the PI compensator 124 calculates a control voltage for the servo valve 115 for canceling the deviation, and outputs to the subtractor 125.

The subtractor 125 subtracts a filtering-processed signal of an acceleration signal by the filter 122 from a control signal calculated by the PI compensator 124 for calculating the control voltage E3. Through this, since the acceleration is negatively fed back to configure a control system loop provided with dumping, a stability of the control system can be improved. The calculated control voltage E3 is transmitted to the servo valve 115 via a D/A converter (not shown) for adjusting a gate opening degree of the servo valve 115.

In the embodiment, a feedback loop of PI control system was configured. However, a feedback loop of PID control system may also be configured. In addition, a position and acceleration of the table 112 were feedback-controlled. However, a control variable which is feedback-controlled is not limited to these, and further, for example, a feedback control system may also be configured by measuring a pressure of air in the air spring 111 or differential value of the pressure.

Meanwhile, with respect to a control of vibration isolator, a detailed explanation was given in the vibration isolator proposed by inventors of the present application in the Patent document 2.

Operation of Vibration Isolator

Next, operations of vibration isolator 100 will be explained by referring to FIG. 14 (FIG. 1 as appropriate).

First, it is assumed that a sufficient time has elapsed after the vibration isolator was activated, and the table 12 is being stabilized within a setting displacement. In this case, the servo valve 115 is being closed, and there is no inflow and outflow of air with respect to the air spring 111.

Here, if a displacement is generated in a position of the table 12 by vibrations from the installation floor of the vibration isolation table 110, or by operations of equipment which is installed on the table 112, the control voltage E3 for stabilizing the position of the table 112 within the setting displacement is calculated by the air spring control unit 120 and output to the servo valve 115 via the D/A converter (not shown), based on a position signal and acceleration signal which were detected by the position detector 113 and acceleration detector 114, respectively, and received via the A/D converter (not shown).

The servo valve 115 opens the valve with a gate opening degree corresponding to the control voltage E3 calculated by the air spring control unit 120, and an air supply from the inlet port 115a or air discharge to the outlet port 115b is conducted for the air spring 111. Through this, a pressure of air in the air spring 111 is adjusted and a position of the table 112 supported by the air spring 111 is controlled to be stabilized within the setting displacement.

On the other hand, when air is supplied to the air spring 111 from the air supply source 10A via the pressure regulator 1, a pressure change of air in the pressure regulator 1 may be generated. Therefore, for compensating the pressure change of air, the pressure regulator 1 calculates the control voltage Ei1 for the servo valve 11 using the computer 16, based on the inflow rate Gin, pressure P, and pressure differential value dP/dt to be measured by the flow meter 12, pressure gauge 14, and pressure differentiator 15, respectively, and transmits to the servo valve 11.

The servo valve 11 opens the valve with a gate opening degree corresponding to the transmitted control voltage Ei1, and air is flown into the isothermal pressure vessel 13. Through this, a pressure P of air in the isothermal pressure vessel 13 is controlled to be stabilized at a target value Pref.

As described above, the vibration isolator 100 according to the embodiment controls a pressure of air to be supplied to the air spring 111 so as to maintain a predetermined pressure by the pressure regulator 1. Therefore, the vibration isolator 100 can rapidly and accurately stabilize a displacement of the position due to, for example, vibrations of the table 112, by controlling the air spring 111 with air supply of stable pressure.

What is claimed is:

1. A pressure regulator, comprising:
   a servo valve for regulating an inflow rate of a compressive fluid to be supplied from a compressive fluid supply source;
   an isothermal pressure vessel for isothermally maintaining the compressive fluid flowing into the isothermal pressure vessel via the servo valve;
   a pressure detection means for detecting a pressure of the compressive fluid in the isothermal pressure vessel;
   a pressure differential value detection means for detecting a pressure differential value of the compressive fluid in the isothermal pressure vessel; and
   a pressure control means for controlling a pressure of the compressive fluid in the isothermal pressure vessel at a predetermined constant pressure by operating the servo valve,
   wherein the pressure control means includes:
   a pressure control system for feedback-controlling the pressure detected by the pressure detection means;
   an inflow rate control system for feedback-controlling the inflow rate of the compressive fluid flowing into the isothermal pressure vessel; and
   an inflow rate-outflow rate difference estimating means for estimating the inflow rate-outflow rate difference that is a difference between the inflow rate of the compressive fluid flowing into the isothermal pressure vessel and the outflow rate of the compressive fluid flowing out from the isothermal pressure vessel based on the pressure differential value detected by the pressure differential value detection means,
   wherein a model follow-up control system for feeding back the inflow rate-outflow rate difference estimated by the inflow rate-outflow rate difference estimating means to the inflow rate control system is configured in a control loop of the pressure control system.

2. The pressure regulator according to claim 1, wherein the servo valve is a spool type servo valve.

3. The pressure regulator according to claim 2, wherein the pressure differential value detection means is a pressure differentiator which includes a pressure chamber, a diaphragm differential manometer or velocity meter, and a cylindrical slit flow path communicating the isothermal pressure vessel and the pressure chamber.

4. The pressure regulator according to claim 2, wherein the inflow rate acquiring means is a laminar flow meter for measuring the inflow rate of the compressive fluid flowing into the isothermal pressure vessel via the servo valve.

5. The pressure regulator according to claim 2, wherein the inflow rate acquiring means estimates the inflow rate of the compressive fluid flowing into the isothermal pressure vessel via the servo valve based on pressures before and after the servo valve and a gate opening degree of the servo valve.

6. The pressure regulator according to claim 2,
   wherein the inflow rate-outflow rate difference estimating means calculates the inflow rate-outflow rate difference (Gin-Gout) by the following formula (7) based on a pressure differential value (dP/dt) of the compressive fluid in the isothermal pressure vessel detected by the pressure differential value detection means, $$\hat{G}_{in} - G_{out} = \frac{V}{R\theta} \frac{dP}{dt} \tag{7}$$

where, R is a gas constant [J/(kg·K)], V is a capacity [m³] of the isothermal pressure vessel, θ is a temperature [K] of air in the isothermal pressure vessel, P is a pressure [Pa] in the isothermal pressure vessel, and t is a time [s].

7. The pressure regulator according to claim 1, wherein the pressure differential value detection means is a pressure differentiator which includes a pressure chamber, a diaphragm differential manometer or velocity meter, and a cylindrical slit flow path communicating the isothermal pressure vessel and the pressure chamber.

8. The pressure regulator according to claim 7, wherein the inflow rate acquiring means is a laminar flow meter for measuring the inflow rate of the compressive fluid flowing into the isothermal pressure vessel via the servo valve.

9. The pressure regulator according to claim 7, wherein the inflow rate acquiring means estimates the inflow rate of the compressive fluid flowing into the isothermal pressure vessel via the servo valve based on pressures before and after the servo valve and a gate opening degree of the servo valve.

10. The pressure regulator according to claim 7,
wherein the inflow rate-outflow rate difference estimating means calculates the inflow rate-outflow rate difference (Gin-Gout) by the following formula (7) based on a pressure differential value (dP/dt) of the compressive fluid in the isothermal pressure vessel detected by the pressure differential value detection means, $$\hat{G}_{in} - G_{out} = \frac{V}{R\theta}\frac{dP}{dt} \quad (7)$$

where, R is a gas constant [J/(kg·K)], V is a capacity [m³] of the isothermal pressure vessel, θ is a temperature [K] of air in the isothermal pressure vessel, P is a pressure [Pa] in the isothermal pressure vessel, and t is a time [s].

11. The pressure regulator according to claim 1,
wherein the inflow rate-outflow rate difference estimating means calculates the inflow rate-outflow rate difference (Gin-Gout) by the following formula (7) based on a pressure differential value (dP/dt) of the compressive fluid in the isothermal pressure vessel detected by the pressure differential value detection means, $$\hat{G}_{in} - G_{out} = \frac{V}{R\theta}\frac{dP}{dt} \quad (7)$$

where, R is a gas constant [J/(kg·K)], V is a capacity [m³] of the isothermal pressure vessel, θ is a temperature [K] of air in the isothermal pressure vessel, P is a pressure [Pa] in the isothermal pressure vessel, and t is a time [s].

12. A pressure regulator, comprising:
a servo valve for regulating an inflow rate of a compressive fluid to be supplied from a compressive fluid supply source;
an isothermal pressure vessel for isothermally maintaining the compressive fluid flowing into the isothermal pressure vessel via the servo valve;
an inflow rate acquiring means for acquiring an inflow rate of the compressive fluid flowing into the isothermal pressure vessel via the servo valve;
a pressure detection means for detecting a pressure of the compressive fluid in the isothermal pressure vessel;
a pressure differential value detection means for detecting a pressure differential value of the compressive fluid in the isothermal pressure vessel; and
a pressure control means for controlling a pressure of the compressive fluid in the isothermal pressure vessel at a predetermined constant pressure by operating the servo valve,
wherein the pressure control means includes:
a pressure control system for feedback-controlling the pressure detected by the pressure detection means;
an inflow rate control system for feedback-controlling the inflow rate acquired by the inflow rate acquiring means; and
an outflow rate estimating means for estimating an outflow rate of the compressive fluid flowing out from the isothermal pressure vessel based on the pressure differential value detected by the pressure differential value detection means and the inflow rate acquired by the inflow rate acquiring means,
wherein the inflow rate control system and a model follow-up control system for feeding back the outflow rate estimated by the outflow rate estimating means to the inflow rate control system are configured in a control loop of the pressure control system.

13. The pressure regulator according to claim 12, wherein the servo valve is a spool type servo valve.

14. The pressure regulator according to claim 13, wherein the pressure differential value detection means is a pressure differentiator which includes a pressure chamber, a diaphragm differential manometer or velocity meter, and a cylindrical slit flow path communicating the isothermal pressure vessel and the pressure chamber.

15. The pressure regulator according to claim 13, wherein the inflow rate acquiring means is a laminar flow meter for measuring the inflow rate of the compressive fluid flowing into the isothermal pressure vessel via the servo valve.

16. The pressure regulator according to claim 13, wherein the inflow rate acquiring means estimates the inflow rate of the compressive fluid flowing into the isothermal pressure vessel via the servo valve based on pressures before and after the servo valve and a gate opening degree of the servo valve.

17. The pressure regulator according to claim 13,
wherein the outflow rate estimating means calculates an estimate value Gout (hat thereon) of the outflow rate of the compressive fluid flowing out from the isothermal pressure vessel by the following formula (8) based on the inflow rate Gin of the compressive fluid flowing into the isothermal pressure vessel and a pressure differential value (dP/dt) of the compressive fluid in the isothermal pressure vessel detected by the pressure differential value detection means, $$\hat{G}_{out} = G_{in} - \frac{V}{R\theta}\frac{dP}{dt} \quad (8)$$

where, R is a gas constant [J/(kg·K)], V is a capacity [m³] of the isothermal pressure vessel, θ is a temperature [K] of air in the isothermal pressure vessel, P is a pressure [Pa] in the isothermal pressure vessel, and t is a time [s].

18. The pressure regulator according to claim 12, wherein the pressure differential value detection means is a pressure differentiator which includes a pressure chamber, a diaphragm differential manometer or velocity meter, and a cylindrical slit flow path communicating the isothermal pressure vessel and the pressure chamber.

19. The pressure regulator according to claim 18, wherein the inflow rate acquiring means is a laminar flow meter for measuring the inflow rate of the compressive fluid flowing into the isothermal pressure vessel via the servo valve.

20. The pressure regulator according to claim 18, wherein the inflow rate acquiring means estimates the inflow rate of the compressive fluid flowing into the isothermal pressure vessel via the servo valve based on pressures before and after the servo valve and a gate opening degree of the servo valve.

21. The pressure regulator according to claim 18,
wherein the outflow rate estimating means calculates an estimate value Gout (hat thereon) of the outflow rate of the compressive fluid flowing out from the isothermal pressure vessel by the following formula (8) based on the inflow rate Gin of the compressive fluid flowing into the isothermal pressure vessel and a pressure differential value (dP/dt) of the compressive fluid in the isothermal pressure vessel detected by the pressure differential value detection means, $$\hat{G}_{out} = G_{in} - \frac{V}{R\theta}\frac{dP}{dt} \qquad (8)$$

where, R is a gas constant [J/(kg·K)], V is a capacity [m³] of the isothermal pressure vessel, θ is a temperature [K] of air in the isothermal pressure vessel, P is a pressure [Pa] in the isothermal pressure vessel, and t is a time [s].

22. The pressure regulator according to claim 12, wherein the inflow rate acquiring means is a laminar flow meter for measuring the inflow rate of the compressive fluid flowing into the isothermal pressure vessel via the servo valve.

23. The pressure regulator according to claim 22, wherein the inflow rate acquiring means estimates the inflow rate of the compressive fluid flowing into the isothermal pressure vessel via the servo valve based on pressures before and after the servo valve and a gate opening degree of the servo valve.

24. The pressure regulator according to claim 22,
wherein the outflow rate estimating means calculates an estimate value Gout (hat thereon) of the outflow rate of the compressive fluid flowing out from the isothermal pressure vessel by the following formula (8) based on the inflow rate Gin of the compressive fluid flowing into the isothermal pressure vessel and a pressure differential value (dP/dt) of the compressive fluid in the isothermal pressure vessel detected by the pressure differential value detection means, $$\hat{G}_{out} = G_{in} - \frac{V}{R\theta}\frac{dP}{dt} \qquad (8)$$

where, R is a gas constant [J/(kg·K)], V is a capacity [m³] of the isothermal pressure vessel, θ is a temperature [K] of air in the isothermal pressure vessel, P is a pressure [Pa] in the isothermal pressure vessel, and t is a time [s].

25. The pressure regulator according to claim 12, wherein the inflow rate acquiring means estimates the inflow rate of the compressive fluid flowing into the isothermal pressure vessel via the servo valve based on pressures before and after the servo valve and a gate opening degree of the servo valve.

26. The pressure regulator according to claim 12,
wherein the outflow rate estimating means calculates an estimate value Gout (hat thereon) of the outflow rate of the compressive fluid flowing out from the isothermal pressure vessel by the following formula (8) based on the inflow rate Gin of the compressive fluid flowing into the isothermal pressure vessel and a pressure differential value (dP/dt) of the compressive fluid in the isothermal pressure vessel detected by the pressure differential value detection means, $$\hat{G}_{out} = G_{in} - \frac{V}{R\theta}\frac{dP}{dt} \qquad (8)$$

where, R is a gas constant [J/(kg·K)], V is a capacity [m³] of the isothermal pressure vessel, θ is a temperature [K] of air in the isothermal pressure vessel, P is a pressure [Pa] in the isothermal pressure vessel, and t is a time [s].

* * * * *